United States Patent
Sugawara et al.

(10) Patent No.: US 6,230,195 B1
(45) Date of Patent: May 8, 2001

(54) COMMUNICATION SYSTEM, USER APPARATUS, CENTER APPARATUS, AND TERMINAL INTERFACE UNIT FOR USE IN COMMUNICATION SYSTEM

(75) Inventors: Mitsuru Sugawara, Sagamihara; Masatoshi Nakao, Tokyo; Hiroyuki Ibe, Yokohama, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/226,007

(22) Filed: Jan. 6, 1999

(30) Foreign Application Priority Data

Jan. 7, 1998 (JP) .................................................. 10-001331

(51) Int. Cl.$^7$ .............................................. G06F 15/177
(52) U.S. Cl. ........................... 709/220; 709/221; 709/226
(58) Field of Search ..................................... 709/220, 221, 709/222, 223, 226, 208, 231, 236, 252, 249, 250, 230, 246; 710/8; 712/100

(56) References Cited

U.S. PATENT DOCUMENTS

| | | | |
|---|---|---|---|
| 5,596,723 | * | 1/1997 | Romohr ................................ 709/222 |
| 5,918,016 | * | 6/1999 | Brewer et al. ........................ 709/220 |
| 5,960,175 | * | 9/1999 | Grossman et al. .................... 709/222 |
| 6,003,097 | * | 12/1999 | Richman et al. ......................... 710/8 |
| 6,073,172 | * | 6/2000 | Frailong et al. ...................... 709/222 |
| 6,098,098 | * | 8/2000 | Sandahl et al. ....................... 709/221 |
| 6,108,712 | * | 8/2000 | Hayes, Jr. ............................ 709/246 |

FOREIGN PATENT DOCUMENTS

| | | | |
|---|---|---|---|
| 0 544 975 A1 | * | 6/1993 | (EP) . |
| 0 740 431 A1 | * | 10/1996 | (EP) . |
| 0 758 822 A1 | * | 2/1997 | (EP) . |

* cited by examiner

Primary Examiner—Zarni Maung
Assistant Examiner—Patrice Winder
(74) Attorney, Agent, or Firm—Finnegan, Henderson, Farabow, Garrett & Dunner, L.L.P.

(57) ABSTRACT

A user apparatus periodically detects the mount state of any terminal interface card, and transmits, to a center apparatus, configuration information indicative of the configuration of the user apparatus and including the detection result, when responding to a request for delay time measurement. The center apparatus recognizes and manages the configuration of the user apparatus on the basis of the configuration information. When newly mounting or removing of a terminal interface card has been recognized, the center apparatus performs newly setting releasing of a destination identifier corresponding to the mounted or removed terminal interface card, and notifies the user apparatus of the newly set destination identifier. The user apparatus, in turn, manages identification information sent from the center apparatus, in relation to the terminal interface unit corresponding to the information. As a result, exchange, addition or cancel of communication services which the user uses can be performed easily.

18 Claims, 13 Drawing Sheets

FIG. 7
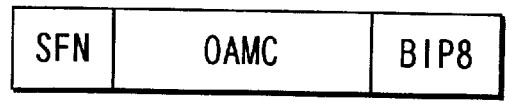
FIG. 8
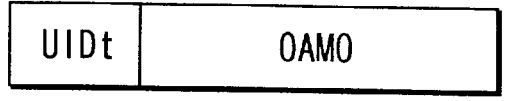
FIG. 9
FIG. 10
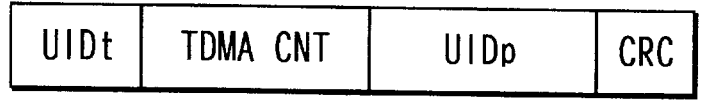
FIG. 11
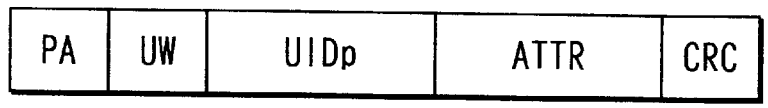
FIG. 12
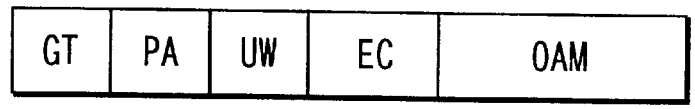
FIG. 13

| CARD NUMBER | CARD CHANNEL NUMBER | CARD ID-k | SERVICE ID | INTERFACE CONTROL | NULL DATA |
|---|---|---|---|---|---|

COMMUNICATION SYSTEM, USER APPARATUS, CENTER APPARATUS, AND TERMINAL INTERFACE UNIT FOR USE IN COMMUNICATION SYSTEM

BACKGROUND OF THE INVENTION

The present invention relates to a communication system in which a center apparatus is connected and opposed to each of user apparatuses via a communication network such as a star-form optical fiber network, and which is arranged to provide communication services to a plurality of terminals connected to each user apparatus, and also relates to the center apparatus, the user apparatus and a terminal interface unit which are used in the communication system.

In the conventional communication system for providing communication services, a communication service provider is connected to users via different communication lines, thereby providing them with communication services which are individually contracted therebetween.

Accordingly, when the user adds another communication terminal to the existing ones for obtaining services through the added terminal as well as the existing ones, or when they disconnect the existing terminals from the communication system, they have to ask the communication provider construction for adding or removing communication lines, or corresponding construction in the center apparatus. This means that high cost and lots of time and labor are required.

Even when the existing communication terminal is exchanged for another type of terminal, the user has to ask the service provider corresponding construction in the center apparatus, and accordingly, cost, time and labor are required.

The conventional problems are summarized as follows:

In the conventional communication system, the communication lines are provided so as to correspond to predetermined communication services, respectively, and the type of a communication service to be provided through each communication line is fixed, with the result that addition, cancellation or exchange of communication services cannot be performed on the user side only, requiring construction by the communication service provider. Thus, high cost and lots of time and labor are required.

BRIEF SUMMARY OF THE INVENTION

Accordingly, it is an object of the present invention to provide a communication system which permits the user to easily perform exchange, addition or cancel of communication services, and also a center apparatus, a user apparatus and a terminal interface unit which implement the communication system.

According to one aspect of the present invention, there is provided a communication system comprising: a center apparatus for providing a plurality of communication services; user apparatuses each connected to the center apparatus via a communication line; terminal interface mounting means provided in each user apparatus and capable of mounting thereon at least one of terminal interface units which are prepared in accordance with desired communication services; terminal interface detecting means provided in the each user apparatus for detecting at a predetermined timing whether or not any terminal interface unit is mounted on the terminal interface mounting means; configuration information transmitting means provided in the each user apparatus for transmitting to the center apparatus, at a predetermined timing, predetermined configuration information indicative of the configuration of the each user apparatus and containing the detection result of the terminal interface detecting means; user configuration managing means provided in the center apparatus for recognizing and managing the configuration of the each user apparatus on the basis of the configuration information transmitted from the each user apparatus; identification information setting means provided in the center apparatus for newly setting, when the user configuration managing means has recognized that a terminal interface unit has-been newly mounted, identification information peculiar to the newly mounted terminal interface unit, and for invalidating, when the user configuration managing means has recognized that a terminal interface unit has been removed, identification information having been set for the removed terminal interface unit; identification information notifying means provided in the center apparatus for notifying identification information newly set by the identification information setting means, to that one of the user apparatuses on which a terminal interface unit corresponding to the newly set identification information is mounted; and identification information managing means provided in the each user apparatus for managing the identification information notified from the center apparatus, in relation to a terminal interface unit corresponding to the notified identification information.

According to another aspect of the present invention, there is provided a communication system comprising: a center apparatus for providing a plurality of communication services; user apparatuses each connected to the center apparatus via a communication line; means for setting a down stream frame period for which a down stream signal, as a transmission signal to be transmitted in the communication line between the each user apparatus and the center apparatus, is transmitted from the center apparatus to the each user apparatus, also for setting an up stream frame period for which an up stream signal, as another transmission signal to be transmitted in the communication line between the each user apparatus and the center apparatus, is transmitted from the each user apparatus to the center apparatus, and for setting pairs of down stream time slots and up stream time slots during each of the down stream and up stream frame periods; time slot assignment storing means provided in the center apparatus and pre-storing the contents of each down stream time slot assigned to a corresponding terminal; down stream frame generating means provided in the center apparatus for generating a down stream frame by dividing, in units of a predetermined length, a signal to be transmitted to terminals, thereby adding at least identification information indicative of each terminal as a destination, to a corresponding signal component resulting from the division, then forming a predetermined down stream packet, determining that one of the down stream time slots which is assigned to a terminal as the destination of the down stream packet with reference to the time slot assignment storing means, and inserting the down stream packet into the determined down stream time slot; down stream frame transmitting means provided in the center apparatus for transmitting the down stream frame generated by the down stream frame generating means, to the communication line during the down stream frame period; down stream time slot managing means provided in the each user apparatus for determining, from the down stream frame transmitted via the communication line during the down stream frame period, that one of the down stream time slots in which identification information corresponding to a terminal connected to the each user apparatus is contained, thereby managing the relationship between the down stream time slot and a terminal to which the down stream time slot is assigned; up stream frame generating means provided in the each user apparatus for generating an up stream frame by forming a predetermined up stream packet which includes signal components obtained by dividing, in units of a predetermined length, a signal transmitted from each terminal connected to the each user apparatus, and also determining, with reference to the management contents of the down stream time slot managing means, that one of the down stream time slots which was assigned to a sender terminal indicated by a signal inserted in the up stream packet, and inserting the up stream packet into an up stream time slot corresponding to the determined down stream time slot; up stream frame transmitting means provided in the each user apparatus for transmitting the up stream frame generated by the up stream frame generating means, to the communication line during the up stream frame period; and sender determining means provided in the center apparatus for determining that a sender terminal which has output a signal inserted in each up stream packet contained in a signal transmitted to the center apparatus via the communication line during the up stream frame period is a terminal to which a down stream time slot corresponding to an up stream time slot which contains the up stream packet is assigned.

According to another aspect of the present invention, there is provided a user apparatus to be connected via a communication line to a center apparatus for providing a plurality of communication services, comprising: terminal interface mounting means capable of mounting thereon at least one of terminal interface units which are prepared in accordance with desired communication services; terminal interface detecting means for detecting at a predetermined timing whether or not any terminal interface unit is mounted on the terminal interface mounting means; configuration information transmitting means for transmitting to the center apparatus, at a predetermined timing, predetermined configuration information indicative of the configuration of the user apparatus and containing the detection result of the terminal interface detecting means; and identification information managing means provided in the user apparatus for managing the identification information notified from the center apparatus, in relation to a terminal interface unit corresponding to the notified identification information.

According to another aspect of the present invention, there is provided a user apparatus to be connected via a communication line to a center apparatus for providing a plurality of communication services, comprising: means for setting a down stream frame period for which a down stream signal, as a transmission signal to be transmitted in the communication line between the user apparatus and the center apparatus, is transmitted from the center apparatus to the user apparatus, also for setting an up stream frame period for which an up stream signal, as another transmission signal to be transmitted in the communication line between the user apparatus and the center apparatus, is transmitted from the user apparatus to the center apparatus, and for setting pairs of down stream time slots and up stream time slots during each of the down stream and up stream frame periods; down stream time slot managing means for determining, from the down stream frames transmitted via the communication line during the down stream frame period, that one of the down stream time slots in which identification information corresponding to a terminal connected to the user apparatus is contained, thereby managing the relationship between the down stream time slot and a terminal to which the down stream time slot is assigned; up stream frame generating means for generating an up stream frame by forming a predetermined up stream packet which includes signal components obtained by dividing, in units of a predetermined length, a signal transmitted from each terminal connected to the user apparatus, and also determining, with reference to the management contents of the down stream time slot managing means, that one of the down stream time slots which was assigned to a sender terminal indicated by a signal inserted in the up stream packet, and inserting the up stream packet into an up stream time slot corresponding to the determined down stream time slot; and up stream frame transmitting means for transmitting the up stream frame generated by the up stream frame generating means, to the communication line during the up stream frame period.

According to another aspect of the present invention, there is provided a center apparatus for providing a plurality of communication services to each of user apparatuses connected thereto via a communication line, comprising: user configuration managing means for recognizing and managing the configuration of the each user apparatus on the basis of the configuration information transmitted from the each user apparatus; identification information setting means for newly setting, when the user configuration managing means has recognized that a terminal interface unit has been newly mounted, identification information peculiar to the newly mounted terminal interface unit, and for invalidating, when the user configuration managing means has recognized that a terminal interface unit has been removed, identification information having been set for the removed terminal interface unit; and identification information notifying means for notifying identification information newly set by the identification information setting means, to that one of the user apparatuses on which a terminal interface unit corresponding to the newly set identification information is mounted.

According to another aspect of the present invention, there is provided a center apparatus for providing a plurality of communication services to each of user apparatuses connected thereto via a communication line, comprising: means for setting a down stream frame period for which a down stream signal, as a transmission signal to be transmitted in the communication line between the each user apparatus and the center apparatus, is transmitted from the center apparatus to the each user apparatus, also for setting an up stream frame period for which an up stream signal, as another transmission signal to be transmitted in the communication line between the each user apparatus and the center apparatus, is transmitted from the each user apparatus to the center apparatus, and for setting pairs of down stream time slots and up stream time slots during each of the down stream and up stream frame periods; time slot assignment storing means pre-storing the contents of each down stream time slot assigned to a corresponding terminal; down stream frame generating means for generating a down stream frame by dividing, in units of a predetermined length, a signal to be transmitted to terminals, thereby adding at least identification information indicative of each terminal as a destination, to a corresponding signal component resulting from the division, then forming a predetermined down stream packet, determining that one of the down stream time slots which is assigned to a terminal as the destination of the down stream packet with reference to the time slot assignment storing means, and inserting the down stream packet into the determined down stream time slot; down stream frame transmitting means for transmitting the down stream frame generated by the down stream frame generating means, to the communication line during the down stream frame period; and sender determining means for determining that a sender terminal which has output a signal inserted in each up stream packet contained in a signal transmitted to the center apparatus via the communication line during the up stream frame period is a terminal to which a down stream time slot corresponding to an up stream time slot which contains the up stream packet is assigned.

According to another aspect of the present invention, there is provided a terminal interface unit to be mounted on terminal interface mounting means in a user apparatus and to be connected to a communication terminal, for interfacing the user apparatus with the communication terminal and performing an interface operation corresponding to a communication service which the user apparatus will obtain, comprising: means for detecting that designation information transmitted to the user apparatus via a designation information transmission line provided for the user apparatus designates the user apparatus itself; and report information output means for outputting, to a report information transmission line provided in the user apparatus, predetermined sender-reporting information containing at least type information indicative of the type of the user apparatus, when the designation information designates the user apparatus itself.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 7 is a view illustrating the configuration of a common down stream OAM signal in detail;

FIG. 8 is a view illustrating the configuration of an individual down stream OAM signal in detail;

FIG. 9 is a view illustrating in detail the configuration of a down stream packet time slot;

FIG. 10 is a view illustrating the configuration of timing management data in detail;

FIG. 11 is a view illustrating the configuration of timing response data in detail;

FIG. 12 is a view illustrating the configuration of an up stream OAM signal in detail;

FIG. 13 is a view illustrating the configuration of an up stream packet time slot in detail;

DETAILED DESCRIPTION OF THE INVENTION

An embodiment of the present invention will be described in detail with reference to the accompanying drawings.

Figure 1:
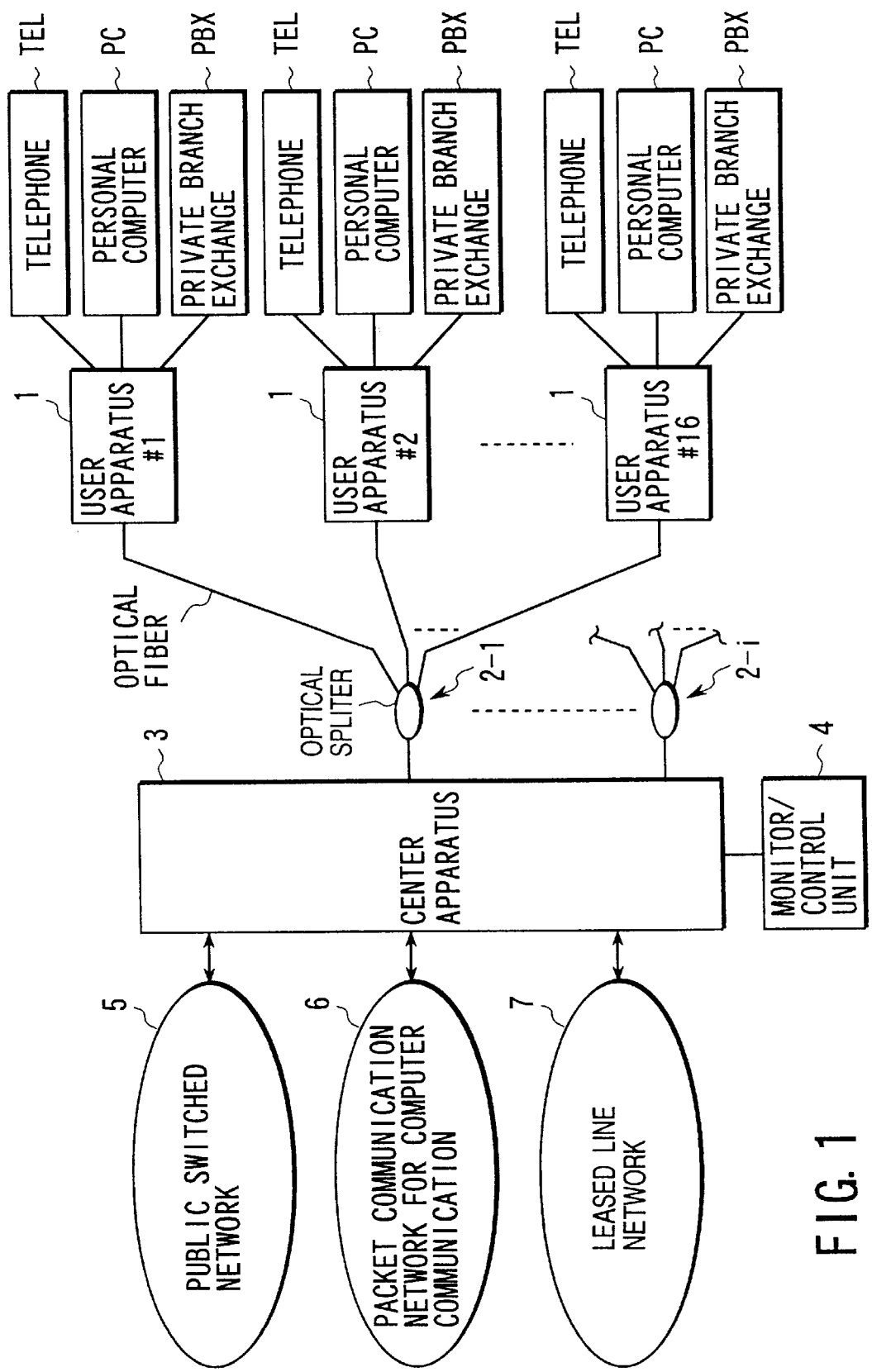
FIG. 1 is a view illustrating the entire configuration of a communication system according to an embodiment of the present invention.

FIG. 1 shows the entire configuration of a communication system according to the embodiment.

In this communication system, multiple user apparatuses 1 are connected to a center apparatus 3 via a plurality of optical fibers 2 (2-1 to 2-i), and communication terminals such as a telephone TEL, a personal computer PC, a private branch exchange PBX, etc. are optionally connected to each user apparatus 1. Further, the center apparatus 3 is connected to existing communication networks such as a monitor/control unit 4, a public switched network 5, a packet communication network 6 for computer communication, a leased line network 7, etc.

The optical fiber network 2 includes optical fibers and optical splitters and constitutes a star-form network. A predetermined number (16 in this embodiment) of user apparatuses 1 can be connected to a single optical fiber network 2. The plural user apparatuses 1 are adapted to commonly use the single optical fiber network under the access control of the center apparatus 3.

Figure 2:
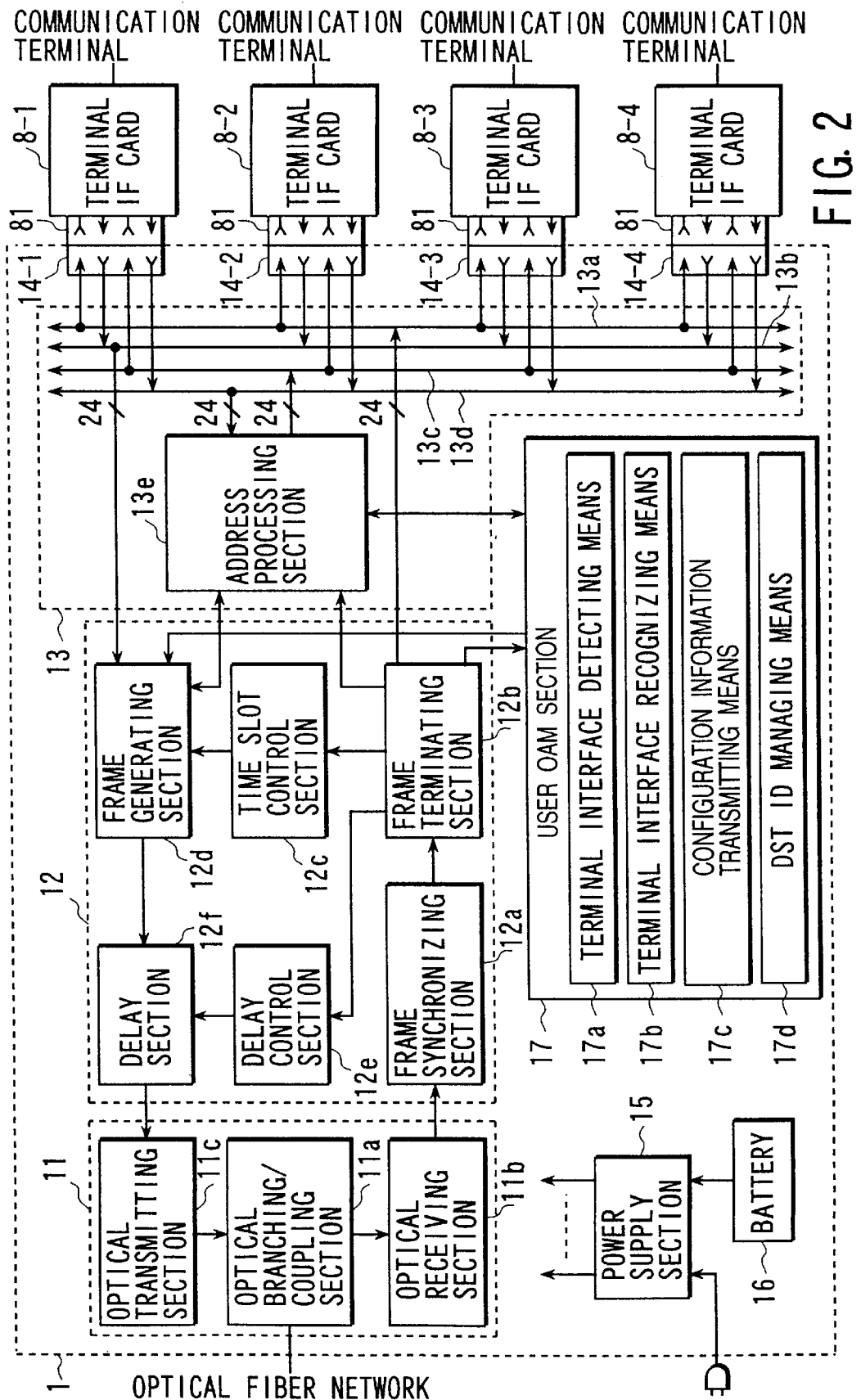
FIG. 2 is a block diagram illustrating in detail a user apparatus.

FIG. 2 is a block diagram showing each user apparatus 1 in detail.

As shown, the user apparatus 1 includes an opto-electric converting section 11, a TDMA processing section 12, a service demultiplexing section 13, four connectors 14 (14-1 to 14-4), a power supply section 15, a buttery 16 and a user OAM (Operation Administration and Maintenance) section 17.

The opto-electric converting section 11 has an optical branching/coupling section 11a, an optical receiving section 11b and an optical transmitting section 11c.

The optical branching/coupling section 11a supplies the optical receiving section 11b with a down stream optical signal having reached the apparatus 1 through the optical fiber network 2, and also transmits an up stream optical signal output from the optical transmitting section 11c.

The optical receiving section 11b converts the down stream optical signal supplied from the optical branching/ coupling section 11a, to an electric signal (a down stream electric signal), and supplies it to the TDMA processing section 12.

The optical transmitting section 11c converts an up stream electric signal supplied from the TDMA processing section 12, to an optical signal (an up stream optical signal), and supplies it to the optical branching/coupling section 11a.

The TDMA processing section 12 has a frame synchronizing section 12a, a frame terminating section 12b, a time slot control section 12c, a frame generating section 12d, a delay control section 12e and a delay section 12f.

The frame synchronizing section 12a receives the down stream electric signal output from the optical receiving section 11a. Since the down stream electric signal is made to have a frame configuration, using a format which will be described later, the frame synchronizing section 12a performs frame synchronization on the down stream electric signal to thereby detect, for example, the position of a frame header.

The frame terminating section 12b separates, from the down stream electric signal, payload information carried via a region (hereinafter referred to as a "payload") used for actual information transmission, and overhead information carried via the other region (hereinafter referred to as an "overhead"), thereby supplying the payload information to the service demultiplexing section 13 and the overhead information to the time slot control section 12c, the delay control section 12e, the service demultiplexing section 13 and the user OAM section 17. The frame terminating section 12b supplies the payload information to the service demultiplexing section 13 after converting the payload information to a data format suitable for one of terminal interface (IF) cards 8 (8-1 to 8-4) on the basis of the relationship between a destination identifier (DST ID) used during transmission between the center apparatus 3 and the user apparatus 1, and one of the mount position addresses of the cards 8.

The time slot control section 12c controls the frame generating section 12d so as to adjust the time slot arrangement and timing in the up stream electric signal on the basis of the time slot arrangement in the down stream electric signal.

The frame generating section 12d causes, under the control of the time slot control section 12c, the payload information supplied from the service demultiplexing section 13, the overhead information supplied from the user OAM section 17, and overhead information generated therein, to have a frame configuration with a predetermined time slot arrangement, thereby generating an up stream electric signal and supplying the signal to the delay section 12f.

The delay control section 12e receives, from the frame terminating section 12b, delay control information contained in the overhead information in the down stream electric signal, thereby controlling the delay section 12f so as to delay the up stream electric signal output from the frame generating section 12d over the time indicated by the delay control information.

The delay section 12f delays the up stream electric signal supplied from the frame generating section 12d under the control of the delay control section 12e, and outputs it to the optical transmitting section 11c of the opto-electric converting section 11.

The service demultiplexing section 13 includes a down stream data bus 13a, an up stream data bus 13b, a down stream address bus 13c, an up stream address bus 13d and an address processing section 13e.

The down stream data bus 13a has a 24-bit width, and is commonly connected to the frame terminating section 12b of the TDMA processing section 12, and to the down stream data terminal (the uppermost terminal in FIG. 2) of each connector 14. The down stream data bus 13a transmits the down stream payload information output from the frame terminating section 12b, to a corresponding terminal interface card 8 connected to each connector 14.

The up stream data bus 13b has a 24-bit width, and is commonly connected to the frame generating section 12d of the TDRA processing section 12, and to the up stream data terminal (the second terminal from above in FIG. 2) of each connector 14. The up stream data bus 13b transmits the up stream payload information output from a corresponding terminal interface card 8 connected to each connector 14, to the frame generating section 12d.

Figure 3:
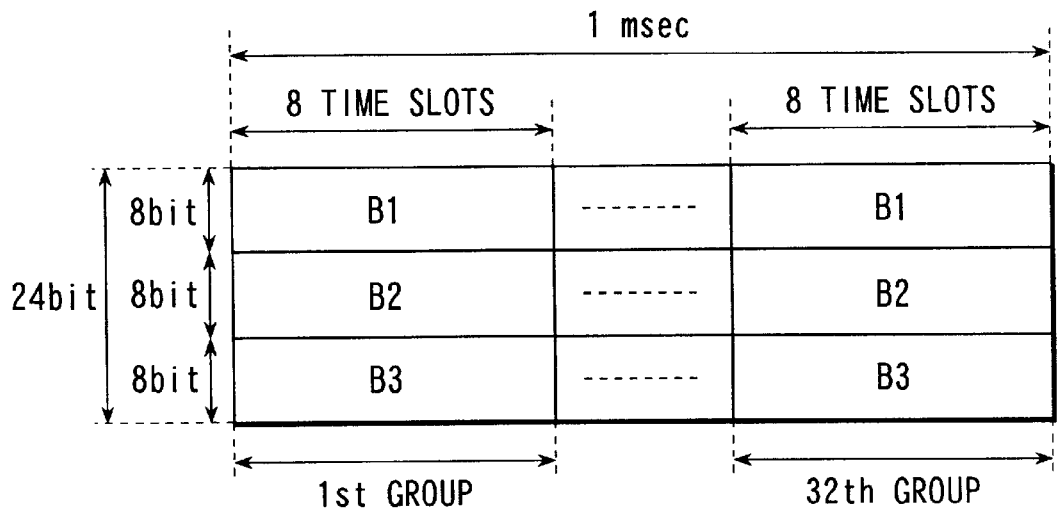
FIG. 3 is a view showing the format of data transmitted through down stream and up stream data buses.

On the down stream and up stream data buses 13a and 13b, eight time slots constitute one group, and thirty-two groups are contained in a time period of 1 msec and constitute one frame. Accordingly, the band which one group can use is of 192 kbit/s (=24×8/1 msec), which corresponds to three B-channels each having a band of 64 kbit/s. As a result, each of the down stream and up stream data buses 13a and 13b can transmit data obtained by multiplexing, in a time division manner, thirty-two groups which are each obtained by multiplexing three B-channels B1, B2 and B3 in units of one byte, as is shown in FIG. 3.

In other words, each user apparatus 1 can use a band of 6.3 Mbit/s (=3B×32=96B) as a whole.

Thus, to connect the above user apparatus to an N-ISDN terminal which has two B-channels and one D-channel, it suffices if only one group is used and one B-channel is assigned to each of the two B-channels and the D-channel. Further, to connect the user apparatus to a usual analog telephone terminal which has two analog channels, it suffices if only one group is used, one B-channel is assigned to each of the analog channels, and the remaining one B-channel is used as a common signal channel for, for example, signaling. Similarly, in the case of leased line services which use a band of 3 B-channels or less, it suffices if one group as a 3 B-channel signal is used. Further, in the case of services which use a band of not less than 3 B-channels (e.g. high-speed computer communication services or high-speed leased line services), it suffices if a plurality of groups are used. If thirty-two groups are used at a time, 96 B-channels (=3 B-channels×32 groups) can be used, which means that services with a band of 6.3 Mbit/s at maximum can be used.

The down stream address bus 13c has a 24-bit width, and is commonly connected to the address processing section 13e, and to the down stream address terminal (the third terminal from above in FIG. 2) of each connector 14. The down stream address bus 13c transmits the down stream address information output from the address processing section 13e, to a corresponding terminal interface card 8 connected to each connector 14.

The up stream address bus 13d has a 24-bit width, and is commonly connected to the address processing section 13e, and to the up stream address terminal (the lowermost terminal in FIG. 2) of each connector 14. The up stream address bus 13d transmits the up stream address information output from a corresponding terminal interface card 8 connected to each connector 14, to the address processing section 13e.

The address processing section 13e determines the destination of the payload information on the basis of header information supplied from the frame terminating section 12b, thereby creating down stream address information corresponding to the destination and outputting it to the down stream address bus 13c. Further, the address processing section 13e receives up stream address information transmitted via the up stream address bus 13d, and permits the frame generating section 12d to transmit data if the sender of data indicated by the up stream address information is the same communication terminal as that indicated by the down stream address information, and if information Null contained in the up stream address information is not "Null". The address processing section 13e also notifies the user OAM section 17 of part of the up stream address information.

Each connector 14 is used to connect, when necessary, a corresponding terminal interface card 8 to the user apparatus 1. When the terminal interface card 8 is mounted in the user apparatus 1, the connector 14 connects the internal circuit (which will be described later) of the card 8 to the down stream and up stream buses 13a and 13b and to the down stream and up stream address buses 13c and 13d.

The power supply section 15 receives power from the commercial power supply or the battery 16, thereby generating power for driving each section of the apparatus and supplying it to each section.

The user OAM section 17 controls each section of the user apparatus 1 to implement the functions of the user apparatus 1. The user OAM section 17 also controls transmission of OAM information between itself and the center apparatus 3, failures in the user apparatus, or control such as return testing.

The user OAM section 17 includes a main control circuit such as a microprocessor, and is adapted to implement, by software, terminal interface detecting means 17a, terminal interface recognizing means 17b, configuration information transmitting means 17c and DST ID managing means 17d, as well as processing means for performing the above-described monitoring or controlling processing.

The terminal interface detecting means 17a detects, via a leased bus connected to each connector 14, whether or not each terminal interface card 8 is connected to a corresponding connector 14. The terminal interface recognizing means 17b recognizes attributes (maker's name, specification number, the types of communication services which can be provided, etc.) of each mounted terminal interface card 8 detected by the terminal interface detecting means 17a.

Concerning the detection/recognition processing, it may be constructed such that each terminal interface card 8 spontaneously outputs, for example, its attributes to the terminal interface recognizing means 17b when it is connected to a corresponding connector 14, or such that the terminal interface recognizing means 17b requests the mounted terminal interface cards 8 at predetermined points of time via leased buses connected to the connectors 14, to output their attributes.

The configuration information transmitting means 17c creates configuration information indicative of the configuration of the user apparatus 1 on the basis of the detection result of the terminal interface detecting means 17a and the recognition result of the terminal interface recognizing means 17b, thereby supplying the configuration information to the frame generating section 12d to thereby cause the section 12d to transmit it to the center apparatus 3.

The DST ID managing means 17d manages the relationship between a to-be-notified destination identifier (DST ID), which is set by the center apparatus 3 for each terminal interface card 8 connected to a corresponding connector 14, and the terminal interface card 8, and then to control address generation performed by the address processing section 13e, i.e. to control demultiplexing operation of the section 13e, on the basis of the relationship.

Figure 4:
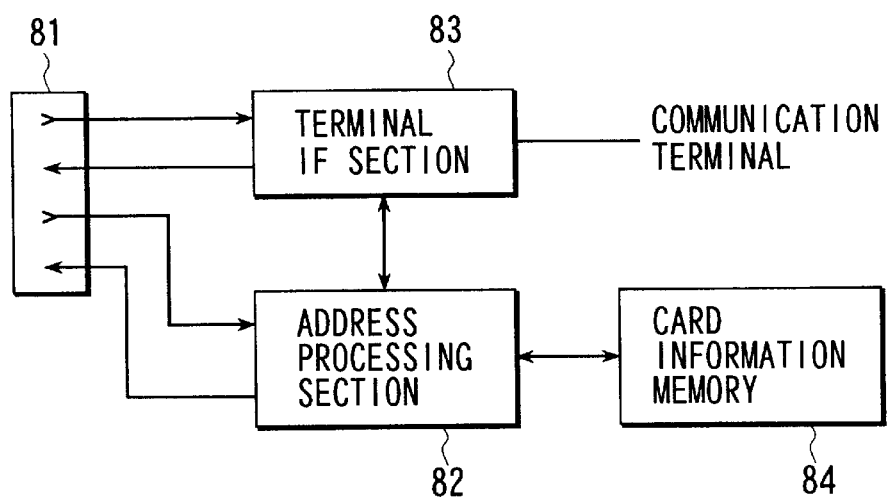
FIG. 4 is a block diagram showing a specific example of a terminal interface card.

FIG. 4 is a block diagram showing a specific example of the configuration of the terminal interface card 8.

As is shown in this figure, each terminal interface card 8 includes a connector 81, an address processing section 82, a terminal interface (IF) section 83 and a card information memory 84.

The connector 81 is to be connected to a corresponding connector 14 of the user apparatus 1. Like the connector 14, the connector 81 has a down stream data terminal, an up stream data terminal, a down stream address terminal and an up stream address terminal. When the connector 81 is connected to the connector 14, corresponding terminals are electrically connected to each other. The down stream data terminal (the uppermost terminal in FIG. 4) and the up stream data terminal (the second terminal from above in FIG. 4) are connected to the address processing section 82. The down stream address terminal (the third terminal from above in FIG. 4) and the up stream address terminal (the lowest terminal in FIG. 4) are connected to the terminal interface section 83.

The address processing section 82 monitors the down stream address information transmitted to the down stream address bus 13c of the user apparatus 1 via the connector 81, and controls the terminal interface section 83 so as to input data from the down stream data bus 13a and output data to the up stream data bus 13b, when it has detected, in the address information, a destination identifier (DST ID) related to the terminal interface section 83 of the card 8. Further, while the address processing section 82 detects the destination identifier (DST ID) related to the terminal interface section 83 of the card, it creates up stream address information (which will be described later) by adding to the destination identifier (DST ID) attribute information stored in the card information memory 84, and feeds the up stream address information to the up stream address terminal of the connector 81.

The terminal interface section 83 has a single or plural terminal connection ports, and performs interface processing such as conversion of a signal output from a communication terminal connected to each terminal connection port, to data suitable for transmission through the up stream address bus 13b, or conversion of data input from the down stream data bus 13a, to a signal suitable for the communication terminal connected to the terminal connection port.

Various types of cards suitable for analog telephone services, N-ISDN services, data communication services, etc. are prepared as the terminal interface cards 8. Such various types of interface cards incorporate various types of interface sections 83 which perform different processes corresponding to different services.

Attribute information concerning the card 8, such as the maker's name, the specification number, the types of communication services the card can provide, etc., is written into the card information memory 84 when, for example, the card is produced, and stored therein.

Figure 5:
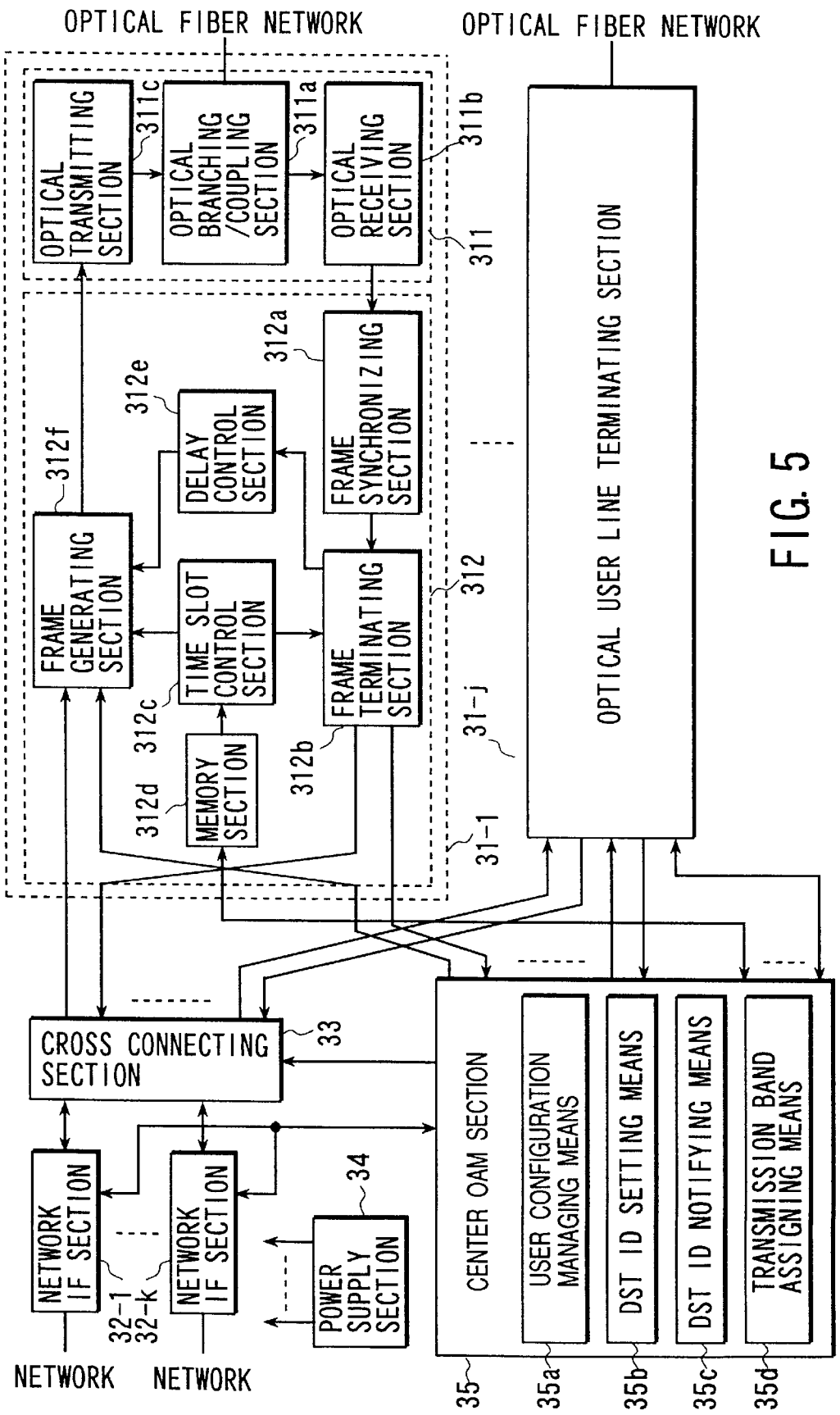
FIG. 5 is a block diagram illustrating a center apparatus in detail.

FIG. 5 is a block diagram showing the configuration of the center apparatus in detail.

As is shown, the center apparatus 3 includes a plurality (a number j) of optical user line terminating sections 31 (31-1 to 31-j), a plurality (a number k) of network interface (IF) sections 32 (32-1 to 32-k), a cross connecting section 33, a power supply section 34 and a center OAM section 35.

Each optical user line terminating section 31 is connected to the optical fiber network 2 when necessary, and has an opto-electric converting section 311 and a TDMA processing section 312.

The opto-electric converting section 311 includes an optical branching/coupling section 311a, an optical receiving section 311b and an optical transmitting section 311c.

The optical branching/coupling section 311a supplies the optical receiving section 311b with an up stream optical signal having reached the apparatus 1 through the optical fiber network 2, and also transmits a down stream optical signal output from the optical transmitting section 311c to the optical fiber network 2.

The optical receiving section 311b converts the up stream optical signal supplied from the optical branching/coupling section 311a, to an electric signal (an up stream electric signal), and supplies it to the TDMA processing section 312.

The optical transmitting section 311c converts a down stream electric signal supplied from the TDMA processing section 312, to an optical signal (a down stream optical signal), and supplies it to the optical branching/coupling section 311a.

The TDMA processing section 312 has a frame synchronizing section 312a, a frame terminating section 312b, a time slot control section 312c, a memory section 312d, a delay control section 312e and a frame generating section 312f.

The frame synchronizing section 312a receives the up stream electric signal output from the optical receiving section 311b. Since the up stream electric signal is made to have a frame configuration, using a format which will be described later, the frame synchronizing section 312a performs frame synchronization on the up stream electric signal to thereby detect, for example, the position of a frame header.

The frame terminating section 312b separates, from the up stream electric signal, payload information and overhead information, thereby supplying the payload information to the cross connecting section 33 and the overhead information to the time slot control section 312c, the delay control section 312e and the center OAM section 35. The frame terminating section 312b supplies the payload information to the cross connecting section 33 after converting the payload information to a data format suitable for processing performed by the cross connecting section 33.

The time slot control section 312c controls the timing of information separation in the frame terminating section 312b, or the timing of processing in the frame generating section 312f to impart a frame configuration, on the basis of a frame format indicated by information in various tables (which will be described later) which are stored in the memory section 312d.

The delay control section 312e measures a signal transmission delay time for each user apparatus 1, and determines the transmission timing of each user apparatus 1 on the basis of the measurement result, so that the up stream optical signals output from user apparatuses 1 separated from the center apparatus 3 by different distances will not collide with each other on the optical fiber network 2. The section 312e then creates delay control information for notifying each user apparatus 1 of the transmission timing, and supplies it to the frame generating section 312f.

The frame generating section 312f causes, under the control of the time slot control section 312c, the payload information supplied from the cross connecting section 33, the overhead information supplied from the center OAM section 35, the overhead information (delay control information) supplied from the delay control section 312e, and overhead information generated therein, to have a frame configuration with a predetermined time slot arrangement, thereby generating a down stream electric signal and supplying the signal to the optical transmitting section 311c of the opto-electric converting section 311.

The network interface section 32 is connected, when necessary, to existing communication networks such as the public switched network 5, the packet communication network 6 for computer communication, the leased line network 7, etc. The network interface section 32 supplies each network with data output from the cross connecting section 33 after converting the data to a data format or a signal format corresponding to the connected network, and also supplies the cross connecting section 33 with data or signals transmitted via each network after converting them to a data format suitable for the processing performed by the cross connecting section 33. The SDH (Synchronous Digital Hierarchy) method can also be used as a communication method between the network interface section 32 and each network.

The cross connecting section 33 separates the up stream data supplied in a time division manner from a plurality of communication terminals via the optical user line terminating section 31, and then outputs the data to the optical user line terminating section 31 or the network interface section 32, connected to the network which is connected to the destination communication terminal. Further, the cross connecting section 33 outputs data supplied from the network interface section 32, to the optical user line terminating section 31 connected to the network which is connected to the destination communication terminal. The cross connecting section 33 collects a plurality of data items to be output to the same optical user line terminating section 31, and outputs them in a time division manner and in a predetermined order.

The power supply section 34 receives power from, for example, the commercial power supply, thereby creating power for driving each section and supplying it to each section.

The center OAM section 35 controls each section of the center apparatus 3 to implement the functions of the center apparatus 3. The center OAM section 35 also monitors and controls transmission of OAM information between itself and the user apparatus 1, failures in the center apparatus, or control such as return testing.

The center OAM section 35 includes a microprocessor as a main control circuit, and is adapted to implement, by software, user configuration managing means 35a, DST ID setting means 35b, DST ID notifying means 35c and transmission band assigning means 35d, as well as processing means for performing the above-described monitoring or controlling processing.

The user configuration managing means 35a manages the configuration of each user apparatus 1 (such as the attributes of the terminal interface card 8 mounted in the user apparatus 1, the mounting position of the card 8, etc.) on the basis of the configuration information transmitted from the user apparatus 1. The DST ID setting means 35b performs setting of a new destination identifier (DST ID), or change or invalidation of the identifier when the user configuration managing means 35a has detected a change in the configuration of each user apparatus 1. The DST ID notifying means 35c notifies the user apparatus 1 corresponding to the destination identifier (DST ID) of the newly set, changed or invalidated destination identifier (DST ID). The transmission band assigning means 35d performs assignment of a new transmission band, or change or invalidation of the transmission band for each terminal interface card 8, when the user configuration managing means 35a has detected a change in the configuration of a corresponding user apparatus 1.

The monitor/control unit 4 includes, for example, a work station and controls the entire communication system. This unit 4 performs, for example, the following processes:

(1) A setting/releasing process for, for example, increasing/reducing the transmission bandwidth of each user apparatus 1 in units of 3B (1B indicates a transmission band of 64 kb/s);

(2) A monitoring process for monitoring breakage, of lines, errors, etc.;

(3) A loop back process for each user apparatus 1;

(4) A process for managing subscriber information (subscriber name, service item, line capacity, etc.); and (5) A process for managing accountings.

The operation of the communication system constructed as above will now be described.

The optical fiber network 2 employs the TDM (Time Division Multiplexing) system for the down stream transmission, and the TDMA (Time Division Multiple Access) system for the up stream transmission in order to enable two-way transmission using a single optical fiber cable and the same light wavelength.

Figure 6:
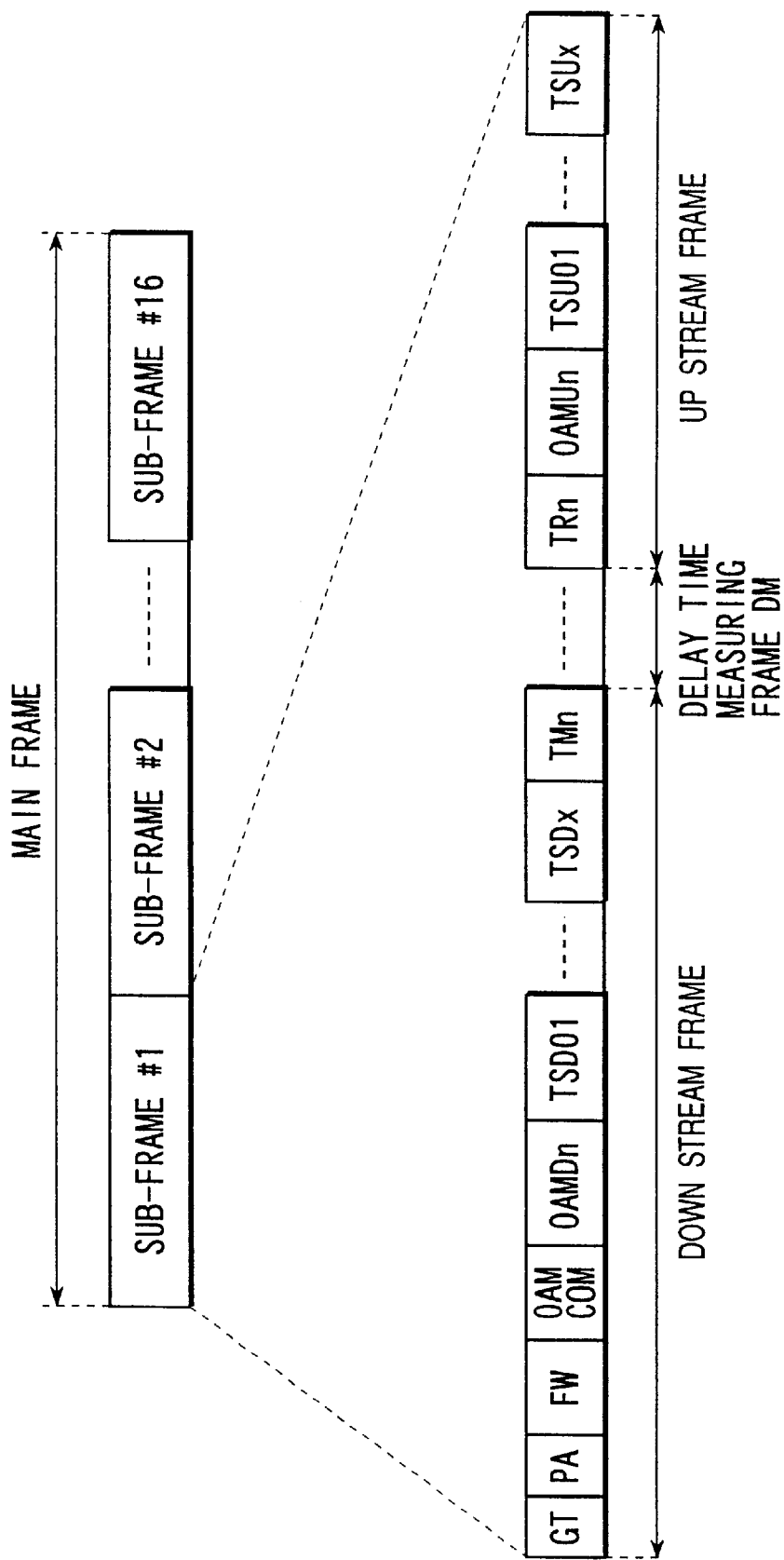
FIG. 6 is a view illustrating the configuration of a transmission frame on an optical fiber network.

FIG. 6 shows the configuration of a transmission frame used on the optical fiber network 2.

The transmission frame on the optical fiber network 2 is formed by repeating a main frame which consists of the same number (16 in this embodiment) of sub-frames as a maximum number of user apparatuses 1 which can be included in a single optical fiber network 2.

Each sub-frame consists of a down stream frame for transmitting information from the center apparatus 3 to each user apparatus 1, a delay measuring frame (DM) for measuring a transmission delay time between the center apparatus 3 and the user apparatus 1, and an up stream frame for transmitting information from each user apparatus 1 to the center apparatus 3. The delay measuring frame (DM) is interposed between the down stream and up stream frames, and at least secures a data space corresponding to a time period required for an optical signal to reciprocate over the-maximum allowable distance between the center apparatus 3 and the user apparatus 1.

Although the same number of sub-frames as the allowable maximum number of user apparatuses are set, it does not mean that one sub-frame is assigned to one user apparatus 1. User information concerning a certain user apparatus 1 is transmitted using one sub-frame. That is, the transmission cycle of user information corresponds to the cycle of each sub-frame. Concerning the delay measuring frame (DM), only one frame (DM) is set in each sub-frame, which means that the measurement of a transmission delay time between the center apparatus 3 and each user apparatus 1 can be performed using only a sub-frame which corresponds to the each user apparatus 1. Thus, the main frame is set as a cycle required for measuring the transmission delay time of all user apparatuses 1 connected to the single optical fiber network 2.

Further, each of the down stream and up stream frames is divided into some time slots each used to transmit information, OAM data, etc.

Each down stream frame sets therein guard time data (GT), preamble data (PA), framing word data (FW), a common down stream OAM signal (OAM COM), an individual down stream OAM signal (OAMDn) for a particular user apparatus 1 (with an identification number of n), a plurality (a number X) of time slots for down stream packets (TSD01 to TSDx), and timing management data (TMn) for the particular user apparatus. On the other hand, each up stream frame sets therein timing response data (TRn) for the particular user apparatus 1, an up stream OAM signal (OAMUn) for the particular user apparatus 1, and a plurality (a number X) of time slots for up stream packets (TSU01 to TSUx).

The guard time data (GT) indicates an unoccupied time slot used to separate the down stream frame of a sub-frame and the up stream frame of a sub-frame immediately before the first-mentioned one.

The preamble data (PA) is used to perform phase synchronization and set an identification level for a down stream frame which reaches the user apparatus 1 in a burst manner, using alternate signals "1" and "0".

The framing word data (FW) is a fixed bit pattern used to perform frame synchronization. The framing word data (FW) and the preamble data (PA) function as overhead data of the down stream frame.

The common down stream OAM signal (OAM COM) is used to simultaneously transmit alarm information, monitoring information and control information, and its detailed configuration is shown in FIG. 7. As is illustrated in FIG. 7, the common down stream OAM signal (OAM COM) includes sub-frame number information (SFN) indicative of the number (1 to 16) of the sub-frame and used for notifying the user apparatus 1 of the sub-frame number, actual OAM information (OAMC) for performing monitor and control, and BIP8 value (BIP8) indicative of a BIP8 value contained in a down stream sub-frame immediately before the present one, and used for monitoring the error rate of the down stream transmission line. The OAM information (OAMC) sets, for example, the stop or start of all the user apparatuses 1.

The individual down stream OAM signal (OAMDn) is used to monitor and control an individual user apparatus 1, and its detailed configuration is shown in FIG. 8. As is shown in FIG. 8, the individual down stream OAM signal (OAMDn) is constituted of an identifier (UIDt) indicative of a to-be-monitored or controlled user apparatus 1, and actual OAM information (OAMO). The OAM information (OAMO) is used, for example, to instruct the user apparatus to read the attributes of the user apparatus 1, to set the start or stop of the user apparatus 1, to set the user apparatus 1 so as to perform a return test or to release the setting, to instruct the user apparatus to read the attributes of each terminal interface card mounted in the user apparatus 1, or to set a return test or release the setting. Further, since the individual down stream OAM signal (OAMDn) is transmitted to one user apparatus 1 using one sub-frame, transmission of data to all the user apparatus 1 connected to the signal optical fiber network 2 is arranged to be completed after one main frame processing.

Each of the down stream packet time slots (TSD01 to TSDx) is used to transmit a down stream packet which contains down stream user information, and the configuration of the down stream packet to be transmitted using each down stream packet time slot (TSD01 to TSDx) is shown in detail in FIG. 9. As is shown in FIG. 9, the down stream packet is constituted of a destination identifier (DST ID) for identifying a terminal connecting port incorporated in the terminal interface card 8 mounted in each user apparatus 1, a staff byte (BUFF: "0" is input) used for aligning, the length of the down stream packet with that of the up stream packet, OAM information (OAMB) used for performing OAM in units of B, type information (INFFLG) indicative of the type of user information (INFO) immediately after present user information, and the present user information (INFO).

The timing management data (TMn) is used for the center apparatus 3 to notify the user apparatus 1 of various types of information necessary for delay control, and its detailed configuration is illustrated in FIG. 10. As is understood from FIG. 10, the timing management data (TMn) includes a variable user identifier (UIDt) assigned from the center apparatus 3 to each user apparatus 1 in a manner depending upon the configuration of the user apparatus 1, delay control information (TDMA CNT) indicative of a delay correcting time or the transmission time point of the timing response data (TRn), a fixed user identifier (UIDp) fixedly assigned to each user apparatus 1, and an error correcting sign (CRC) for detecting an error.

The signals output from different user apparatuses 1 to the center apparatus 3 differ in phase because of incomplete delay adjustment and a delay time due to external factors. Moreover, the amplitudes of the signals output from different user apparatuses 1 to the center apparatus 3 also differ because of variations in the loss of transmission lines or in the components of the user apparatuses. In light of this, preamble data (PA) used for phase synchronization and identification value adjustment, and unique word data (UW) user for byte synchronization are set in each time slot as shown in FIGS. 11 to 13. Further, to prevent collision of up stream signals, guard time data (GT) is set in a header portion of each of the timing response data (TRn) and the up stream packet time slot. If, however, the delay control and the transmission level adjustment in the user apparatus 1 are performed at high accuracy, the preamble data (PA) and the guard time data (GT) can be omitted.

The timing response data (TRn) is used to notify the center apparatus 3 of various information for delay control from each user apparatus 1, and its detailed configuration is shown in FIG. 11. As is shown in FIG. 11, the timing response data (TRn) includes fixed user identifier (UIDp) assigned to a user apparatus 1 as the originator, configuration information (ATTR) indicative of the configuration of the originator user apparatus 1, and error correcting sign (CRC) for detecting errors, as well as the aforementioned preamble data (PA) and unique word data (UW).

The up stream OAM signal (OAMUn) is used to notify the center apparatus 3 of warning or a state such as user apparatus failure or a transmission line error rate, and its detailed configuration is shown in FIG. 12. As is shown in FIG. 12, the up stream OAM signal (OAMUn) includes secret story control code (EC) and OAM information (OAMO) indicative of warning or a state such as user apparatus failure or a transmission line error rate, as well as the aforementioned guard time data (GT), preamble (PA) and unique word data (UW).

Each up stream packet time slot (TSUO1 to TSUx) is used to transmit a packet which contains up stream user information, and the detailed configuration of an up stream packet to be transmitted using the up stream packet time slot (TSU01 to TSUx) is shown in FIG. 13. As is shown in FIG. 13, the up stream packet includes OAM information (OAMB) used for performing monitor and control in units of 1B (1B: a transmission band of 64 kb/s), type information (INFFLG) indicative of the type of user information (INFO) immediately after present user information, and the present user information (INFO), as well as the aforementioned guard time data (GT), preamble (PA) and unique word data (UW). The type information (INFFLG) can be omitted.

Each of the down stream packet time slots (TSD01 to TSDx) and the up stream packet time slots (TSU01 to TSUx) in each sub-frame can transmit user information of 3B (64 kbit/s). Specifically, if the cycle of each sub-frame is 1 msec, a single packet time slot can carry user information of 192 bits (24 bytes). This means that one group of user information in the down stream data bus 13a and the up stream data bus 13b of each user apparatus 1 can be transmitted using a single down stream packet time slot (TSD01 to TSDX) and a single up stream packet time slot (TSU01 to TSUx).

Any new subscriber of the communication system asks, for example, the service provider to lay an optical fiber from an optical splitter included in a corresponding optical fiber network 2, thereby connecting their own user apparatuses 1 to the optical fiber.

On the other hand, when the service provider receives a new subscriber, they assign fixed user identification information (UIPp) to a user apparatus 1 newly installed, register the information in the center apparatus 3 or the monitor/control unit 4, and notify the user of the registration. Upon being notified of the fixed user identification information (UIDp), the user registers it in the user apparatus 1. Alternatively, the service provider beforehand assigns UIDp to each user apparatus, and the apparatus maker, for example, registers it in the apparatus. The user of each user apparatus notifies the service provider of the UIDp of the apparatus before they use them. The service provider, in turn, registers the notified UIDp in the center apparatus or the monitor/control unit.

Thus, the new user apparatus 1 is included in the communication system of the present invention.

The included user apparatus 1 uses the assigned sub-frame to transmit necessary information between itself and the center apparatus 3.

(Delay Control)

The distance between the optical splitter and the user apparatus 1 connected thereto differs between different user apparatuses in a single optical fiber network 2. Accordingly, the time required until an up stream optical signal transmitted from the user apparatus 1 reaches the optical splitter connected to the apparatus differs between different user apparatuses 1. Therefore, if the user apparatuses 1 transmit up stream optical signals at time points as shown in FIG. 6, it is possible that they will collide with each other in some optical splitters.

To avoid the above, delay control is performed as described below to adjust the time point of each optical signal in a corresponding optical splitter as shown in FIG. 6.

First, the center OAM section 35 of the center apparatus 3 inserts, as the delay control information (TDMA CNT) in the timing management data (TMn), information indicating that delay control is being performed, and also inserts, in the timing management data (TMn), the fixed user identifier (UIDp) assigned to the user apparatus 1 in which the delay control has not yet been completed, thereby transmitting a signal to the optical fiber network 2.

In each user apparatus 1, the OAM section 17 monitors the down stream frame in each sub-frame, and controls the frame generating section 12d so as to generate timing response data (TRn) when it has detected that information indicating that delay control is being performed is inserted as the delay control information (TDMA CNT) in the timing management data (TMn), and also that the fixed user identifier (UIDp) assigned to the user apparatus 1 itself is inserted in the timing management data (TMn). The timing response data (TRn) is output, under the control of the time slot control section 12c, from the frame generating section 12d at the same time when the transmission of the timing management data (TMn) is finished. The delay control section 12e sets the delay amount of the delay section 12f at "0" if the delay control information (TDMA CNT) of the timing management data (TMn) indicates that the delay control is being performed. Thus, the timing response data (TRn) is transmitted as an up stream optical signal to the optical fiber network 2 at the same time when the transmission of the timing management data (TMn) is finished.

When the center apparatus 3 has received the timing response data (TRn) transmitted from the user apparatus 1 which is now under delay control, the delay control section 312e measures the time period from the time point at which the transmission of the timing management data (TMn) has been terminated, to the time point at which the timing response data (TRn) has been received, thereby calculating a delay time for designating the transmission time point of the user apparatus 1 on the basis of the measured time.

Figures 14, 15:
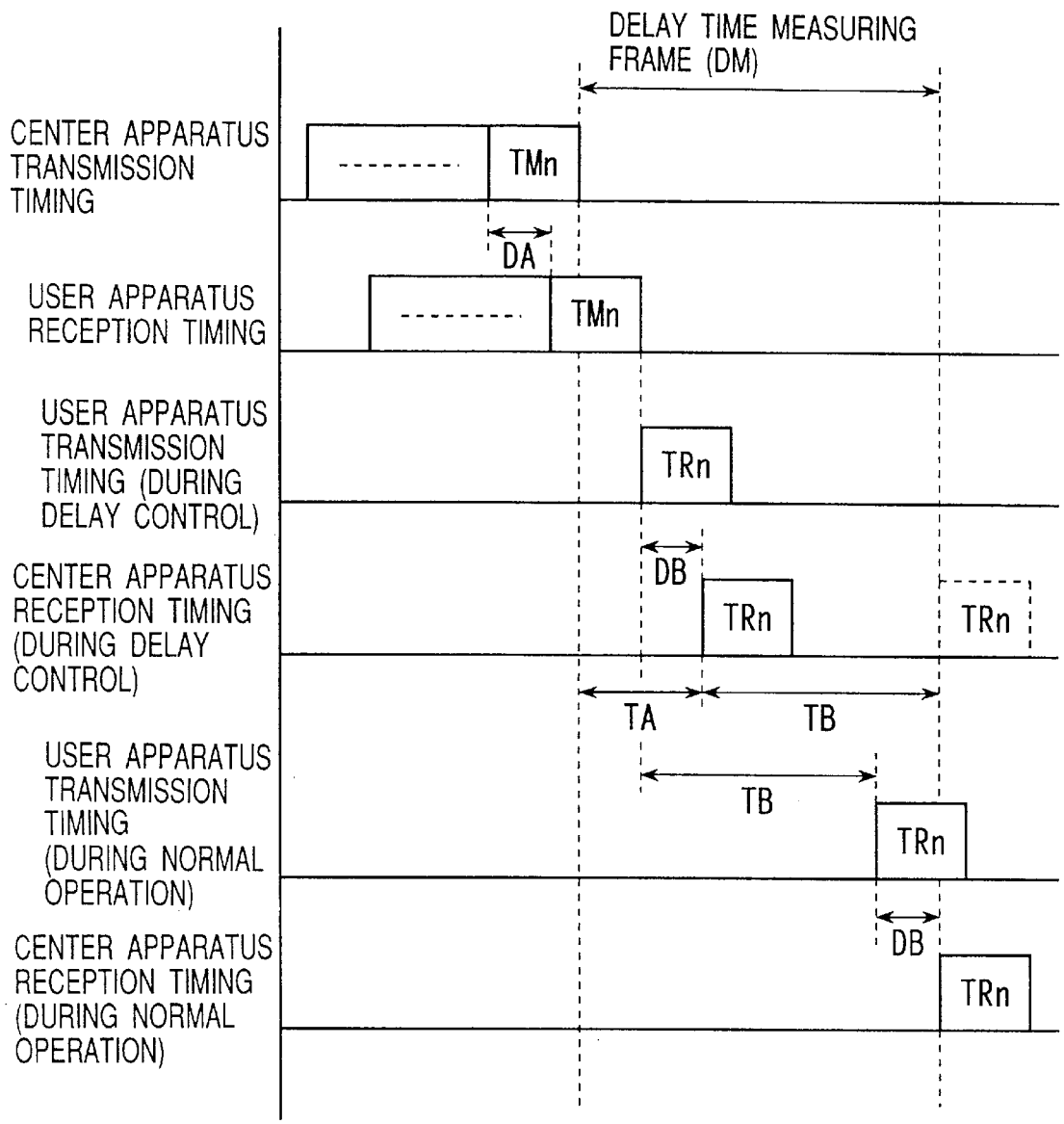
FIG. 14 is a view useful in explaining delay control.
FIG. 15 is a view showing the configuration of up stream address information.

Specifically, as shown in FIG. 14, the timing management data (TMn) reaches the user apparatus 1 after a delay DA. At the time point at which the user apparatus 1 cannot receive the timing management data (TMn) anymore, the user apparatus 1 transmits the timing response data (TRn). The timing response data (TRn) reaches the center apparatus 3 after a delay DB. As a result, the time period from the time point at which the transmission of the timing management data (TMn) is finished, to the time point at which the timing response data (TRn) is received is TA, which is measured by the delay control section 312e of the center apparatus 3.

In a usual state for actually transmitting user information, the time point (indicated by the broken line in the figure) at which reception of the timing response data (TRn) is started upon termination of the transmission of the delay measuring frame (DM) is a regular time point. In other words, the time point of reception of the timing response data (TRn) by the center apparatus 3 during delay control advances by a time period TB.

Accordingly, if in the usual state, the user apparatus 1 transmits the timing response data (TRn) as the up stream optical signal the time TB after the termination of the reception of the timing management data (TMn), the timing response data is delayed by the delay DB, with the result that the time point at which the response data is received by the center apparatus coincides with the termination time point of the delay measuring frame (DM).

In other words, in the delay section 12f of the user apparatus 1, the up stream electric signal supplied from the frame generating section 12d is delayed by the time period TB, whereby the time point at which the up stream optical signal is received by the center apparatus 3 can be made to coincide with the time point shown in FIG. 6, and therefore signal collision can be avoided.

The time period TB corresponds to the time obtained by subtracting the time period TA from the time assigned to the delay measuring frame (DM). Accordingly, the delay control section 312e of the center apparatus 3 can obtain the time period TB by which the user apparatus 1 delays a signal, by subtracting the time period TA from the time assigned to the delay measuring frame (DM).

More specifically, the time assigned to the delay measuring frame (DM) is pre-set in a reception counter, and the reception counter is made to perform down stream-counting until the timing response data (TRn) reaches. At this time, the pre-set down stream-counting value indicates the time period TB.

After finishing the calculation of the time period TB, the delay control section 312e of the center apparatus 3 writes the time period TB as a delay correcting time period into the timing management data (TMn) section included in the next main frame, thereby notifying the user apparatus 1 of it.

Upon receiving it, the delay control section 12e of the user apparatus 1 recognizes the delay correcting time period TB written in the timing management data (TMn) section, and thereafter controls the delay section 12f so as to delay, by the time period TB, the up stream electric signal supplied from the frame generating section 12d. In this state, the user apparatus 1 transmits the timing response data (TRn).

The center apparatus 3, in turn, recognizes that the arrival time point of the timing response data (TRn) of the user apparatus 1 has become a predetermined time point, thereby completing the delay control. After the delay control is finished, the delay control section 312e of the center apparatus 3 notifies that the delay control has been finished, using the delay control information (TDMA CNT) of the next main frame.

Upon receiving the information indicating that the delay control has been finished, the user apparatus 1 transmits an up stream frame which includes the up stream packet time slot as well as the timing response data (TRn). Then, the center apparatus 3 confirms the up stream frame which includes the up stream packet time slot, and hence confirms that the user apparatus 1 and the center apparatus 3 are synchronized with each other, thereby notifying the user apparatus 1 of it. Provision of services is started for the first time after the above confirmation.

The above-described delay control enables the center apparatus 3 to normally receive data transmitted from each user apparatus 1, without collision in the optical splitters. (Plug and Play)

A plurality of communication terminals can be connected to the user apparatus 1, and simultaneous communication using these communication terminals can be implemented within the range of the transmission bandwidth of each sub-frame.

Each terminal interface card 8 for connecting a corresponding communication terminal is mountable and dismountable into and from the user apparatus 1. These cards 8 correspond to the types of communication terminals to be connected. The user obtains a terminal interface card 8 which corresponds to a communication terminal to be connected, and mounts it into the user apparatus 1.

The communication system of the embodiment performs, in a manner described as below, "plug and play" processing for automatically recognizing how the terminal interface card 8 is mounted in the user apparatus 1, using the center apparatus 3, thereby implementing communication via the terminal interface card 8.

First, in the user apparatus 1, terminal interface cards 8 are scanned at predetermined terminal interface scanning time points (e.g. at the start of the apparatus and at regular intervals after the start), thereby detecting the number of the cards 8 mounted, their attributes (such as maker names, specification numbers, the types of services which can be provided, etc.), and the addresses of the card-mounted positions.

Each connector 14 has a physical address which is notified of to a corresponding one of the terminal interface cards 8 physically mounted, using the voltage of a pin (not shown). Upon receiving the physical address of the connector 14, the terminal interface card 8 uses the address as a card number which serves as its own physical address. The card number is stored in a card information memory 84.

At the predetermined terminal interface scanning time points, the address processing section 13e of the service demultiplexing section 13 supplies, in units of one group (i.e. once every 1132 msec), the down stream address bus 13c with the physical address of each connector 14 (i.e. the card number of the terminal interface card 8 connected to the connector 14).

The address processing section 82 of each terminal interface card 8 monitors the down stream address bus 13c, and supplies, when it has detected its own physical address in it, the up stream address bus 13d with up stream address information of a configuration as shown in FIG. 15, which includes its card number, card-channel number, card ID-k, service ID, interface control data and Null display data. The down stream address information also has a configuration as shown in FIG. 15.

The card-channel number is used when the terminal interface section 83 has a plurality of terminal connecting ports, to identify the port used. The service ID is used for the terminal interface card 8 to identify a service provided (such as an analog telephone service, an N-ISDN service). The card ID indicates the maker name, the number of specification editions, etc. In general, the card ID is information of about several bytes, and hence requires a large bus width if the entire information is transmitted at once. In light of this, the card ID is divided into, for example, a start byte, a sheet ID-k (k=1, 2, ... , n) and a stop byte. In other words, it is divided into (n+2) portions, which can be transmitted separately. The interface control data is used to transfer control information or alarm information concerning the terminal interface card 8. The Null display data is used to indicate that there is no information to be output from the terminal interface card 8 to the up stream data bus 13b, or from the down stream data bus 13a to the terminal interface card 8.

The up stream address information to be output from the address processing section 82 of the terminal interface card 8 uses the Null display data to indicate that no data has been output.

Upon receiving the above-described up stream address information, the address processing section 13e of the user apparatus 1 supplies the OAM section 17 with necessary information included in the up stream address information.

The OAM section 17 manages, for example, the connection state in which the terminal interface card 8 is connected to the connector 14, and the attributes of the connected card 8. The OAM section 17 determines a new connection state from information newly fed from the address processing section 13e, thereby comparing the new connection state with the previously managed connection state to detect a newly connected, removed, or exchanged terminal interface card 8, if any (the terminal interface detecting means 17a). Further, when new connection, removal or exchange of a terminal interface card 8 has been detected, the attributes, for example, of the newly connected, removed or exchanged terminal interface card 8 are recognized in detail (the terminal interface recognizing means 17b), and the management information is updated.

((Plug and Play Processing Performed When Starting Service))

Figure 16:
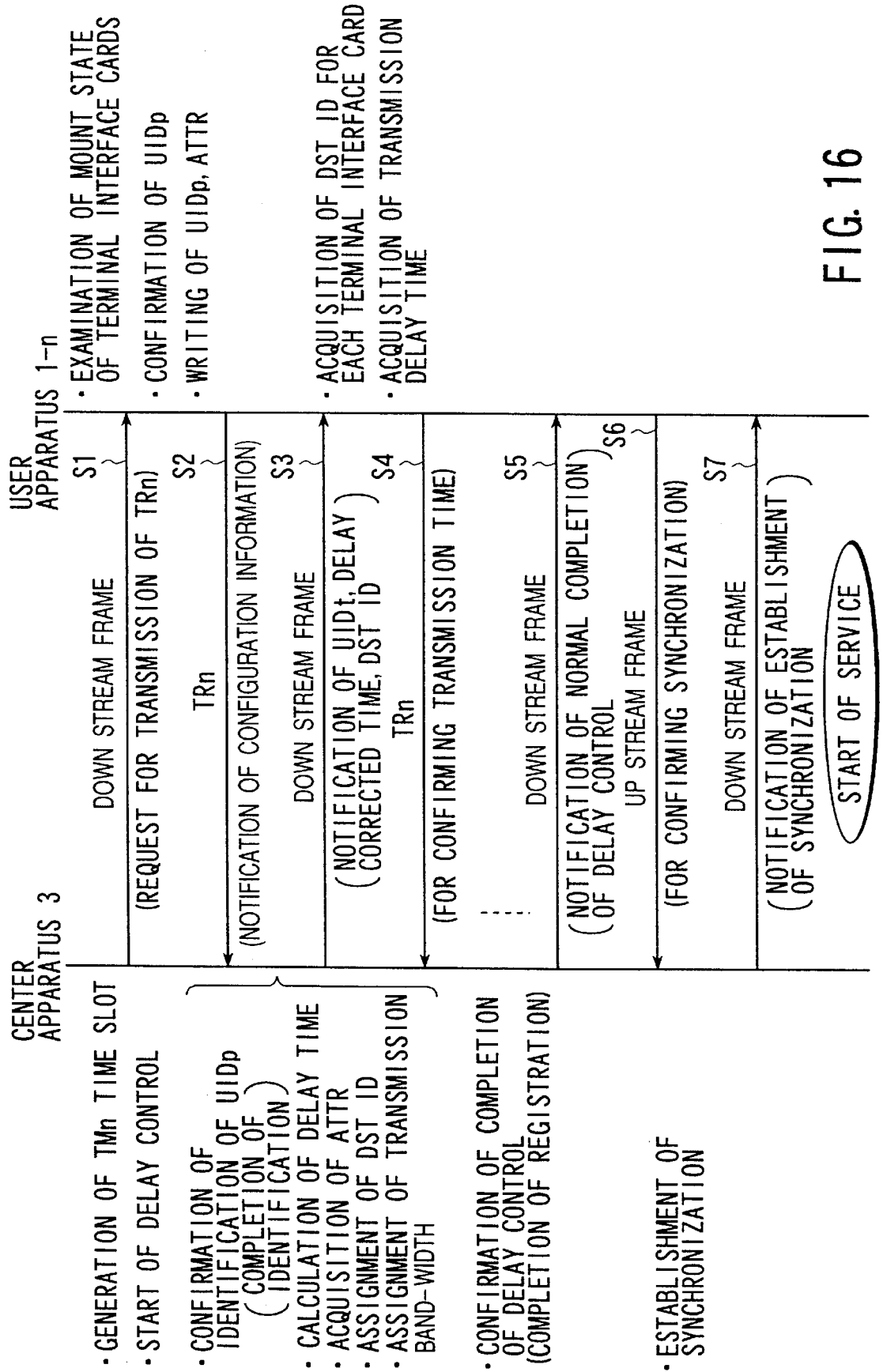
FIG. 16 is a sequence view useful in explaining the procedure of plug and play processing performed when starting a service.

Referring then to the sequence view of FIG. 16, a description will be given of the procedure of plug and play processing performed on a terminal interface card 8 mounted in a user apparatus 1-n for which provision of a service should be newly started.

Where a user apparatus 1-n exists for which provision of a service should be newly started, the center OAM section 35 of the center apparatus 3 controls the frame generating section 312f of the optical user line terminating section 31 corresponding to the optical fiber network 2 connected to the user apparatus 1-n, so as to generate and transmit timing management data (TMn) which contains a fixed user identifier (UIDp) assigned to the user apparatus 1-n (S1). As a result, the above-described delay control processing is started.

When the OAM section 17 of the user apparatus 1-n has received, from the frame terminating section 12b, the timing management data (TMn) with the fixed user identifier (UIDp) corresponding thereto, it recognizes that a request to transmit timing response data (TRn) has been supplied to it. Then, the OAM section 17 controls the frame generating section 12d so as to generate timing response data (TRn) which contains configuration information (ATTR) created on the basis of the management information concerning the terminal interface card 8 and attribute information concerning the user apparatus 1-n itself, and output it when the transmission of the timing management data (TMn) is finished. At this time, the delay amount of the delay section 12f is set at "0" as aforementioned, and the timing response data (TRn) is transmitted in the form of an up stream optical signal to the optical fiber network 2 immediately after the transmission of the timing management data (TMn) is finished (S2).

Upon receiving the timing response data (TRn) transmitted from the user apparatus 1-n, the center OAM section 35 of the center apparatus 3 compares the fixed user identifier (UIDp) contained in the timing management data (TMn) transmitted at S1, with the fixed user identifier (UIDp) contained in the timing response data (TRn), thereby identifying the user. The section 35 also recognizes, from the contents of the configuration information (ATTR), the types and number of terminal interface cards 8 mounted in the user apparatus 1-n, and registers them as management information concerning the user apparatus 1-n (the user configuration managing means 35a).

The center OAM section 35 also determines, on the basis of the recognized information, terminal connection ports which belong to each terminal interface card 8 mounted in the user apparatus 1-n, and assigning, to the ports, destination identifiers (DST ID) which enable identification of the ports (the DST ID setting means 35b). The center OAM section 35 further creates a variable user identifier (UIDt) for the user apparatus 1-n, which contains all the assigned destination identifiers (DST ID). Since the variable user identifier (UIDt) contains all destination identifiers (DST ID) assigned to the terminal connection ports of each terminal interface card 8, its contents will change in accordance with the mount state of terminal interface cards 8. In this point, the variable user identifier differs from the fixed user identifier (UIDp) fixedly assigned to the user apparatus 1. Each of the assigned destination identifiers (DST ID) and the variable user identifier (UIDt) are included in the management information concerning the user apparatus 1-n, and managed.

Moreover, the center OAM section 35 assigns a transmission band to each of the terminal connection ports of each terminal interface card 8 mounted in the user apparatus 1-n (the transmission band assigning means 35d). This transmission band assigning process is provided for assigning the down stream packet time slots (TSD01 to TSDx) and the up stream packet time slots (TSU01 to TSUx) set in each sub-frame, to transmit user information concerning communication terminals connected to the terminal connection ports, and will be described later in detail.

On the other hand, the delay control section 312e of the center apparatus 3 calculates a delay correcting time for the above-described delay control.

The center OAM section 35 controls, in the next main frame, the frame generating section 312f so as to generate timing management data (TMn) which contains a variable user identifier newly assigned to the user apparatus 1-n, delay control information (TDMA CNT) indicative of the calculated delay correcting time, and destination identifiers (DST ID) assigned to the user apparatus 1-n (S3: the DST ID notifying means 35c).

Upon receiving the timing management data (TMn) thus transmitted from the center apparatus 3, the OAM section 17 of the user apparatus 1-n recognizes and stores the destination identifiers (DST ID) assigned to the terminal connection ports of each terminal interface card 8, and the variable user identifier (UIDt) assigned to the user apparatus itself. The identifiers (DST ID) are stored, being associated with the corresponding terminal interface cards 8.

The user apparatus 1-n controls the delay amount of the delay section 12f on the basis of the delay correcting time indicated by the delay control information (TDMA CNT) contained in the timing management data (TMn). Thereafter, as indicated by S4 to S7, the timing response data (TRn), the down stream frame, the up stream frame and the down stream frame are sequentially transmitted between the user apparatus 1-n and the center apparatus 3, thereby performing the processing described in the section of "delay control". After that, the user apparatus 1-n can obtain a communication service.

((Plug and Play Processing Performed After Changing Services))

Even when the provision of communication services has been started in the user apparatus 1-n as a result of the above-described initial plug and play processing, i.e. even when the user apparatus 1-n is operating, newly mounting, removing or exchanging of each terminal interface card 8 can be performed optionally.

Figure 17:
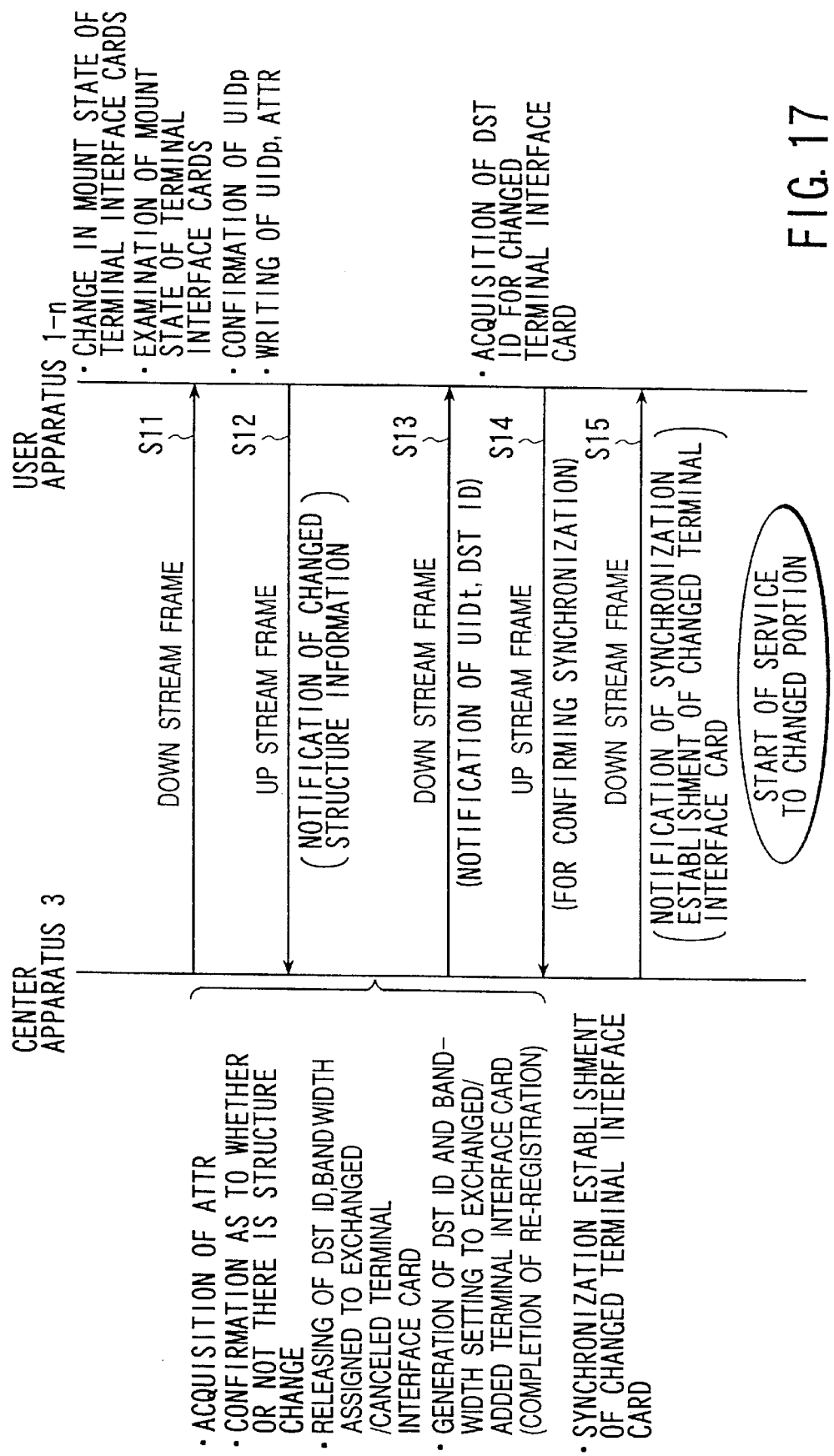
FIG. 17 is a sequence view useful in explaining the procedure of plug and play processing performed when changing a service.

To enable newly mounting, removing or exchanging of each terminal interface card 8, plug and play processing is performed while the user apparatus 1 operates. The procedure of the plug and play processing performed at this time will be described with reference to the sequence view of FIG. 17.

The OAM section 17 of the user apparatus 1-n periodically performs detection of the number of terminal interface cards 8 mounted in the apparatus, detection of the attributes and mount position of each card, and updating of the management information based on the detection results. Accordingly, when any terminal interface card 8 is newly mounted, removed or exchanged for another, the mount state of terminal interface cards 8 after that is managed (the terminal interface detecting means 17a and terminal interface recognizing means 17b).

Each time the OAM section 17 transmits the down stream frame (S11) and then the up stream frame (S12) in each main frame, it inserts, into the timing response data (TRn) in the up stream frame, configuration information (ATTR) based on the updated mount state of the terminal interface cards 8 (the configuration information transmitting means 17c). If the mount state of the terminal interface cards 8 is changed, the configuration information (ATTR) becomes information which indicates the changed mount state, with the result that the center apparatus 3 is automatically notified of the changed mount state.

On the other hand, the center OAM section 35 of the center apparatus 3 determines, upon receiving the timing response data (TRn), whether or not the contents of the configuration information (ATTR) differ from those of the previously received one. If it is confirmed that there is a change in it, the center OAM section 35 updates the management information concerning the user apparatus 1-n (the user configuration managing means 35a).

Furthermore, the center OAM section 35 determines, on the basis of the recognized information, each terminal connection port of each terminal interface card 8 mounted in the user apparatus 1-n, thereby releasing the destination identifiers (DST ID) and the transmission bands assigned to the removed terminal interface card 8, and assigning destination identifiers (DST ID) and transmission bands to the terminal connection ports of a newly mounted terminal interface card 8 (the DST ID setting means 35b and the transmission band assigning means 35d). After releasing and newly assigning destination identifiers (DST ID), the center OAM section 35 creates a variable user identifier (UIDt) which contains all the destination identifiers assigned to the user apparatus 1-n. Each of the assigned destination identifiers (DST ID) and the variable user identifier (UIDt) are included in the management information concerning the user apparatus 1-n, and managed.

The center OAM section 35 controls, in the next main frame, the frame generating section 312f so as to generate timing management data (TMn) which contains the variable user identifier (UIDT) newly assigned to the user apparatus 1-n and the destination identifiers (DST ID) assigned to the user apparatus 1-n (S13: the DST ID notifying means 35c).

When the user apparatus 1-n has received the timing management data (TMn) transmitted from the center apparatus 3, the OAM section 17 recognizes and stores the destination identifiers (DST ID) assigned to the terminal connection ports of each terminal interface card 8 mounted therein, and the variable user identifier (UIDt) assigned to the user apparatus.

Subsequently, the OAM section 17 of the user apparatus 1-n controls the frame generating section 12d so as to generate and transmit an up stream frame containing an up stream packet time slot which has been newly designated to be used for an exchanged or added terminal interface card 8 (S14). Then, the center OAM section 35 of the center apparatus 3 examines the up stream frame containing the up stream packet time slot to confirm whether or not the packet time slot concerning the changed terminal interface card 8 is used in a designated manner, thereby confirming establishment of synchronization concerning the changed terminal interface card 8. If the synchronization is established, the center OAM section 35 notifies the user apparatus 1-n of the establishment of synchronization, using the next main frame (S15).

After that, the changed portion of the user apparatus 1-n can obtain a communication service.

((Plug and Play Processing Performed When Starting Service Which Requires Accountings))

So far, the plug and play processing has been described, which is performed to unconditionally provide a service to any terminal interface card 8 mounted in the user apparatus 1 if the transmission band assigned to the user apparatus 1 is not exceeded.

In the above-described communication system, however, there is a communication service which requires accountings, and there is a case where a usable transmission bandwidth is limited depending upon the contents of contract under which the user is put.

Figure 18:
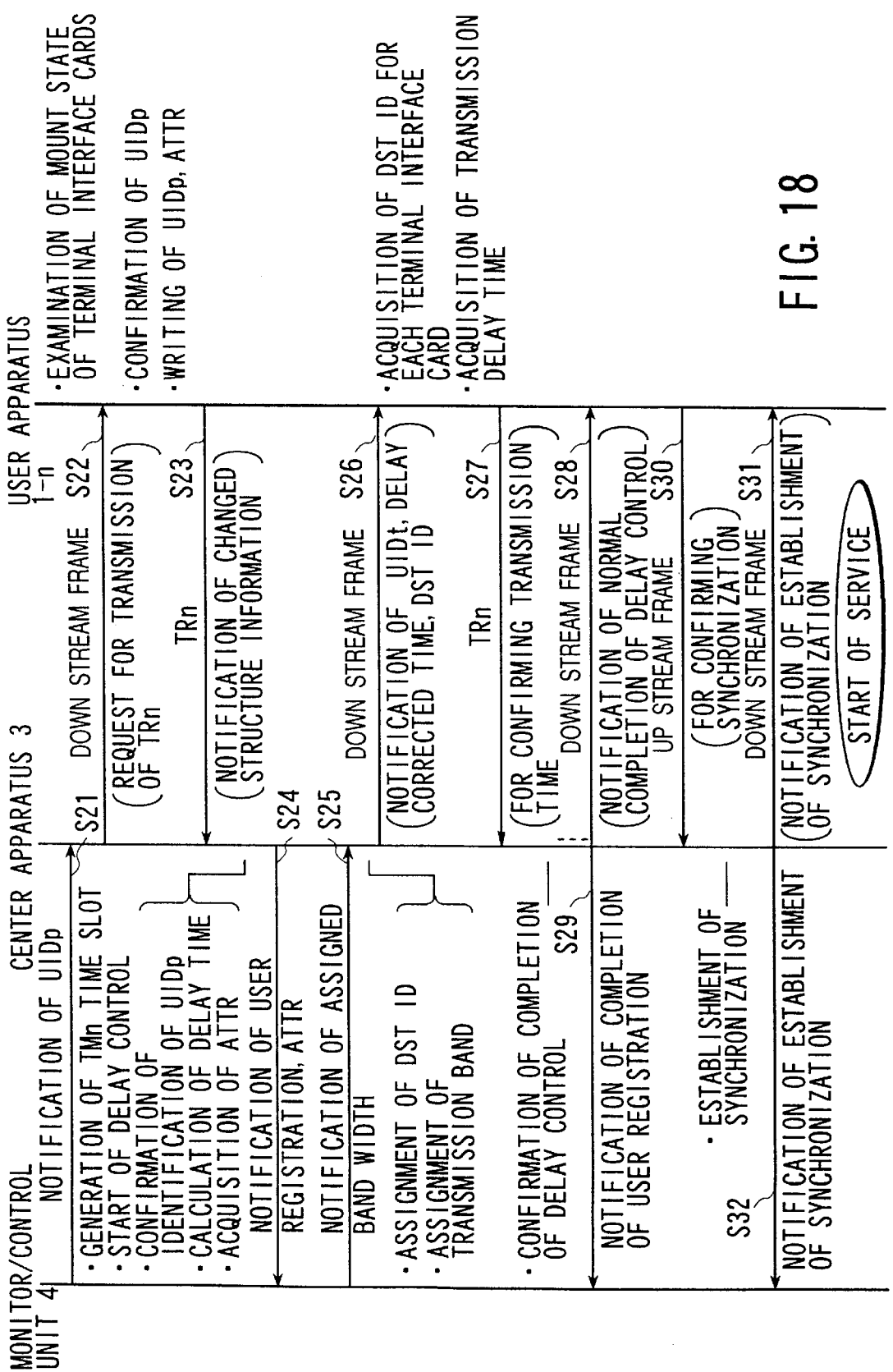
FIG. 18 is a sequence view useful in explaining the procedure of plug and play processing performed when starting a service which requires accountings.

Referring then to the sequence view of FIG. 18, a description will be given of the procedure of plug and play processing performed for each terminal interface card 8, mounted in the user apparatus 1-n, when accountings are required and the usable transmission bandwidth is limited.

In the above case, the management of the contents of the contract or of the accounting for each user apparatus 1 is performed by the monitor/control unit 4. To this end, the monitor/control unit 4 stores the fixed user identifier (UIDp) assigned to each user apparatus 1 and the contents of the contract made for it, in a manner that the former and the latter correspond to each other.

When there is a user apparatus 1-n for which provision of a service should be started, the monitor/control unit 4 notifies the center apparatus 3 of a fixed user identifier (UIDp) assigned to the user apparatus 1-n (S21).

Upon receiving the fixed user identifier (UIDp) from the monitor/control unit 4, the center OAM section 35 of the center apparatus 3 controls the frame generating section 312f of the optical user line terminating section 31 corresponding to the optical fiber network 2 connected to the user apparatus 1-n to which the fixed user identifier (UIDp) is assigned, so as to generate and transmit timing management data (TMn) which contains the fixed user identifier (UIDp)(S22). As a result, the above-described delay control processing is started.

When the OAM section 17 of the user apparatus 1-n has received, from the frame terminating section 12b, the timing management data (TMn) with the fixed user identifier (UIDp) corresponding to the apparatus 1-n, it recognizes that a request to transmit timing response data (TRn) has been supplied to it. Then, the OAM section 17 controls the frame generating section 12d so as to generate timing response data (TRn) which contains configuration information (ATTR) created on the basis of the management information concerning the terminal interface card 8 and attribute information concerning the user apparatus 1-n itself, and output it when the transmission of the timing management data (TMn) is finished. At this time, the delay amount of the delay section 12f is set at "0" as aforementioned, and the timing response data (TRn) is transmitted in the form of an up stream optical signal to the optical fiber network 2 immediately after the transmission of the timing management data (TMn) is finished (S23).

Upon receiving the timing response data (TRn) transmitted from the user apparatus 1-n, the delay control section 312e of the center apparatus 3 calculates a delay correcting time used for the above-described delay control.

On the other hand, the center OAM section 35 compares the fixed user identifier (UIDp) contained in the timing management data (TMn) transmitted at S22, with the fixed user identifier (UIDp) contained in the timing response data (TRn), thereby identifying the user. The center OAM section 35 also recognizes, from the contents of the configuration information (ATTR), the types and number of terminal interface cards 8 mounted in the user apparatus 1-n, and registers them as management information concerning the user apparatus 1-n (the user configuration managing means 35a).

Then, the center OAM section 35 notifies the monitor/control unit 4 of the fact that the user identification has been completed, and also of the obtained configuration information (ATTR)(S24).

Upon receiving the information at S24, the monitor/control unit 4 examines whether or not the configuration of the user apparatus 1-n indicated by the configuration information (ATTR) is suitable for the service contents contracted beforehand, thereby determining a bandwidth to be assigned to each terminal interface card 8 mounted in the user apparatus 1-n, and notifying the center apparatus 3 of it (S25).

Upon receiving the information at S25, the center OAM section 35 of the center apparatus 3 assigns a transmission band to each of the terminal connection ports of each terminal interface card 8 on the basis of the notified contents concerning the band setting (the transmission band assigning means 35d). The center OAM section 35 also assigns destination identifiers (DST ID) to the terminal connection ports of each terminal interface card 8 mounted in the user apparatus 1-n (the DST ID setting means 35b). The center OAM section 35 further creates a variable user identifier (UIDt) for the user apparatus 1-n, which contains all the assigned destination identifiers (DST ID).

After that, the center OAM section 35 controls, in the next main frame, the frame generating section 312f so as to generate timing management data (TMn) which contains the variable user identifier newly assigned to the user apparatus 1-n, delay control information (TDMA CNT) indicative of the calculated delay correcting time, and destination identifiers (DST ID) assigned to the user apparatus 1-n (S26: the DST ID notifying means 35c).

Upon receiving the timing management data (TMn) thus transmitted from the center apparatus 3, the OAM section 17 of the user apparatus 1-n recognizes and stores the destination identifiers (DST ID) assigned to the terminal connection ports of each terminal interface card 8, and the variable user identifier (UIDt) assigned to the user apparatus itself. The identifiers (DST ID) are stored, being associated with the corresponding terminal interface cards 8.

The delay control section 12e of the user apparatus 1-n controls the delay amount of the delay section 12f on the basis of the delay correcting time indicated by the delay control information (TDMA CNT) contained in the timing management data (TMn). In this state, the user apparatus 1 transmits timing response data (TRn) (S27).

Then, the center OAM section 35 of the center apparatus 3 confirms that the arrival time point of the timing response data (TRn) transmitted from the user apparatus 1-n coincides with a predetermined time point, thereby finishing the delay control. When the delay control has been finished, the delay control section 312e of the center apparatus 3 indicates, using delay control information (TDMA CNT) in the next main frame, that the delay control has been finished (S28), and notifies the monitor/control unit 4 that the user registration has been finished (S29).

Upon receiving the information indicative of the completion of the delay control, the OAM section 17 of the user apparatus 1-n controls the frame generating section 12d so as to generate and transmit an up stream frame which contains an up stream packet time slot as well as timing response data (TRn)(S30). Then, the center OAM section 35 of the center apparatus 3 confirms the up stream frame which contains the up stream packet time slot, thereby confirming the establishment of synchronization between the user apparatus 1-n and the center apparatus 3, notifying the user apparatus 1-n of it in the next main frame (S31), and at the same time notifying the monitor/control unit 4 that synchronization establishment has been finished (S32).

After that, the user apparatus 1-n can obtain a communication service.

((Plug and Play Processing Performed After Changing Services Which Require Accountings))

Figure 19:
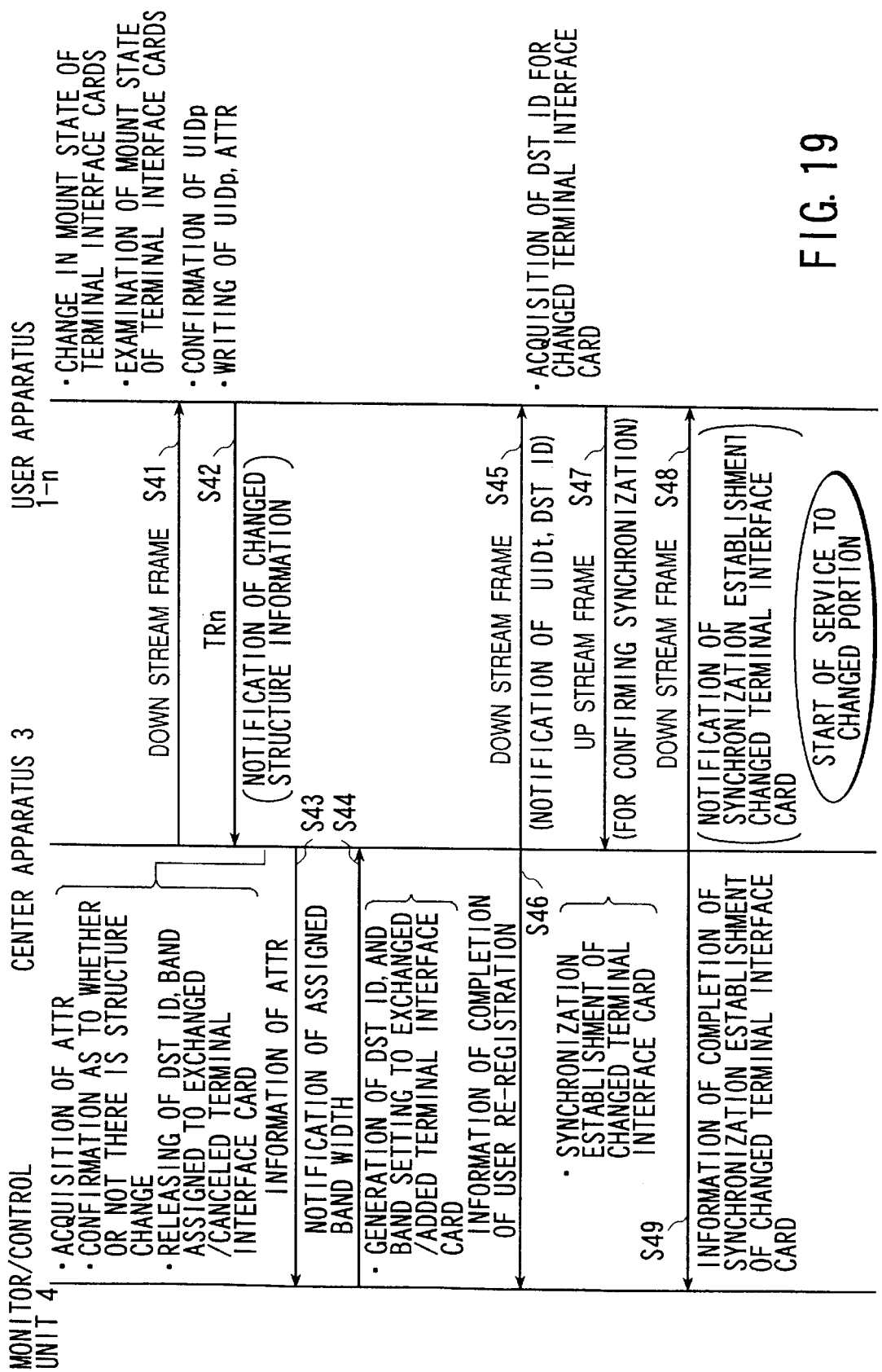
FIG. 19 is a sequence view useful in explaining the procedure of plug and play processing performed when changing a service which requires accountings.

Referring to the sequence view of FIG. 19, a description will be given of the procedure of plug and play processing for dealing with newly mounting, removal or exchange of terminal interface cards 8 in the presently operating user apparatus 1-n after provision of a communication service which requires accountings is started by the initial plug and play processing.

The OAM section 17 of the user apparatus 1-n periodically performs detection of the number of terminal interface cards 8 mounted in the apparatus, detection of the attributes and mount position of each card, and updating of the management information based on the detection results. Accordingly, when any terminal interface card 8 is newly mounted, removed or exchanged for another, the mount state of terminal interface cards 8 after that is managed (the terminal interface detecting means 17*a* and terminal interface recognizing means 17*b*).

Each time the OAM section 17 transmits the down stream frame (S41) and then the up stream frame (S42) in each main frame, it inserts, into the timing response data (TRn) in the up stream frame, configuration information (ATTR) based on the updated mount state of the terminal interface cards 8 (the configuration information transmitting means 17*c*). If the mount state of the terminal interface cards 8 is changed, the configuration information (ATTR) becomes information which indicates the changed mount state, with the result that the center apparatus 3 is automatically notified of the changed mount state.

On the other hand, the center OAM section 35 of the center apparatus 3 determines, upon receiving the timing response data (TRn), whether or not the contents of the configuration information (ATTR) differ from those of the previously received one. If it is confirmed that there is a change in it, the center OAM section 35 updates the management information concerning the user apparatus 1-n (the user configuration managing means 35*a*).

Furthermore, the center OAM section 35 determines, on the basis of the recognized information, each terminal connection port of each terminal interface card 8 mounted in the user apparatus 1-n, thereby releasing the destination identifiers (DST ID) and the transmission bands assigned to the removed terminal interface card 8.

After that, the center OAM section 35 notifies the monitor/control unit 4 that the configuration of the user apparatus 1-n has been changed, while sending new configuration information (ATTR)(S43).

Upon receiving the information at S43, the monitor/control unit 4 determines, from the contents of the information, whether or not there is any terminal interface card 8 which has been exchanged, added or newly mounted. If there is, the unit examines whether or not the configuration of the user apparatus 1-n indicated by the configuration information (ATTR) is suitable for the service contents contracted beforehand, thereby determining, in accordance with the contracted contents, a bandwidth to be assigned to each terminal interface card 8 mounted in the user apparatus 1-n, and notifying the center apparatus 3 of it (S44).

Upon receiving the information at S44, the center OAM section 35 of the center apparatus 3 assigns a transmission band to each of the terminal connection ports of each terminal interface card 8 on the basis of the notified contents concerning the band setting (the transmission band assigning means 35*d*). The center OAM section 35 also assigns destination identifiers (DST ID) to the terminal connection ports of each terminal interface card 8 mounted in the user apparatus 1-n (the DST ID setting means 35*b*). The center OAM section 35 further creates a variable user identifier (UIDt) for the user apparatus 1-n, which contains all the assigned destination identifiers (DST ID).

After that, the center OAM section 35 controls, in the next main frame, the frame generating section 312*f* so as to generate and transmit timing management data (TMn) which contains the variable user identifier (UIDt) newly assigned to the user apparatus 1-n, and destination identifiers (DST ID) assigned to the user apparatus 1-n (S45: the DST ID notifying means 35*c*). At this time, the center OAM section 35 notifies the monitor/control unit 4 that the user registration has been finished (S46).

Upon receiving the timing management data (TMn) transmitted from the center apparatus 3, the OAM section 17 of the user apparatus 1-n recognizes and stores the destination identifiers (DST ID) assigned to the terminal connection ports of each terminal interface card 8, and the variable user identifier (UIDt) assigned to the user apparatus itself.

Subsequently, the OAM section 17 of the user apparatus 1-n controls the frame generating section 12*d* so as to generate and transmit an up stream frame containing an up stream packet time slot which has been newly designated to be used for an exchanged or added terminal interface card 8 (S47). Then, the center OAM section 35 of the center apparatus 3 examines the up stream frame containing the up stream packet time slot to confirm whether or not the packet time slot concerning the changed terminal interface card 8 is used in a designated manner, thereby confirming establishment of synchronization concerning the changed terminal interface card 8. If the synchronization is established, the center OAM section 35 notifies the user apparatus 1-n of the establishment of synchronization, using the next main frame (S48), and simultaneously notifies the monitor/control unit 4 that synchronization establishment has been finished (S49).

After that, the changed portion of the user apparatus 1-n can obtain a communication service.

(Transmission Band Assignment Processing and Data Transmission Processing Using Assigned Transmission Band)

Figure 20:
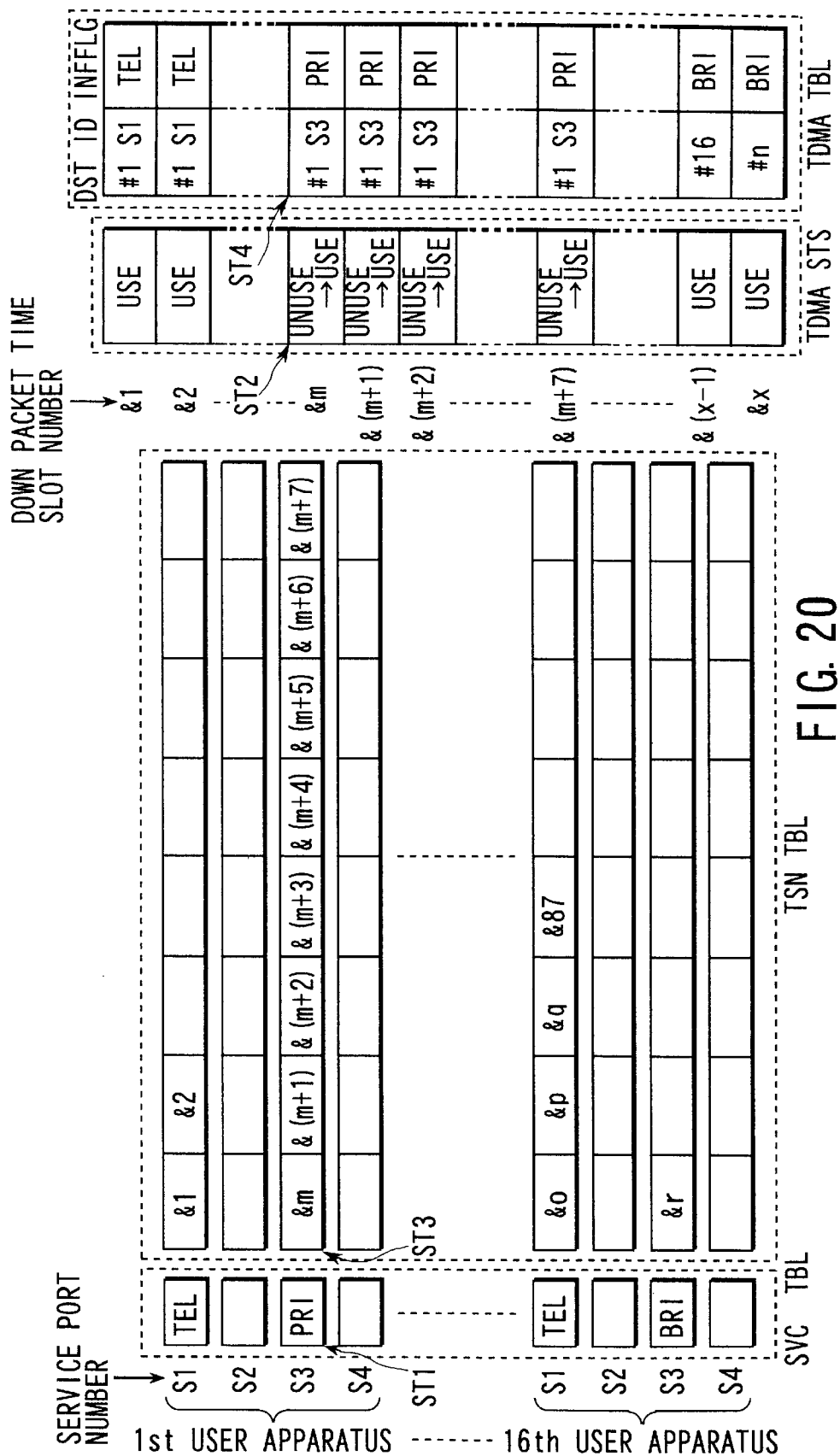
FIG. 20 is a view illustrating a service table, a time slot number table, a TDMA status and a TDMA table, which are stored in a memory section.

To perform these processes, the memory section 312*d* provided in the center apparatus 3 stores a service table (SVC TBL), a time slot number table (TSN TBL), a TDMA status (TDMA STS), and a TDMA table (TDMA TBL), as is shown in FIG. 20.

The service table is used to register service types corresponding to terminal interface cards 8 connected to connectors 14 (four connectors at maximum in this embodiment) incorporated in each of sixteen user apparatuses 1, which are connectable, via the optical fiber network 2, to the optical user line terminating section 31 provided with the memory section 312*d*. In this table, the types of services are made to correspond to respective service port numbers assigned to the connectors 14. In FIG. 20, the terminal interface card 8 connected to a connector 14 with a service port number "S1" in a first user apparatus 1, for example, corresponds to a telephone service (TEL).

The time slot number table is used to register the number (&1 to &x) of each of down stream packet time slots (TSD01 to TSDx) assigned to the terminal interface card 8 connected to a connector 14 with each service port number. In this table, the number of each down stream packet time slot is made to correspond to the service port number, and eight down stream packet time slot numbers at maximum can be registered for one service port number. In FIG. 20, down stream packet time slots with numbers "&1" and "&2", for example, are assigned to the terminal interface card 8 connected to the connector 14 with the service port number "S1" in the first user apparatus 1.

The TDMA status is used to register whether or not each down stream packet time slot (TSD01 to TSDx) with a corresponding number (&1 to &X) has been assigned to any terminal interface card 8. In FIG. 20, "USE" indicates that the down stream packet time slots with the numbers "&1" and "&2", for example, are already assigned to the terminal interface card 8 connected to the connector 14 with the service port number "S1" in the first user apparatus 1.

The TDMA table is used to register destination identifiers (DST ID) indicative of the destinations of user information transmitted using down stream packet time slots (TSD01 to TSDx), and type information (INFFLG) on the user information, such that the destination identifiers correspond to the type information (INFFLG) items, using the numbers (&1 to &x) assigned to the down stream packet time slots. In FIG. 20, the down stream packet time slots with the numbers "&1" and "&2", for example, are used to transmit telephone information (TEL) to a terminal with a destination identifier (DST ID) of "#1 S1".

A detailed description will now be given of a process for assigning a transmission band where a terminal interface card 8 corresponding to an ISDN primary group service (PRI) is newly connected to a connector 14 with a service port number "S3" incorporated in one of the user apparatuses 1 (i.e. the first user apparatus) connected to the optical user line terminating section 31-1 via the optical fiber network 2.

When the center OAM section 35 has recognized the above as a result of the aforementioned plug and play processing, it first registers, in an area of the service table corresponding to the service port number "S3" of the first user apparatus, the fact that the service is the ISDN primary group service (PRI)(ST1).

Since the bandwidth, i.e. the number of down stream packet time slots, necessary for the service is determined from the contents of the service, the center OAM section 35 then determines the number of necessary down stream packet time slots. Since in this case, the service is the ISDN primary group service and the transmission speed is 23B+D, it is determined that eight down stream packet time slots are necessary. The center OAM section 35, therefore, refers to the TDMA status, thereby detecting a necessary number (eight in this case) of unused down stream packet time slots (which are indicated by "UNUSE" in the TDMA status). Supposing that down stream packet time slots with numbers "&m" to "&(m+7)" have been detected, the contents of the TDMA status corresponding to these numbers are rewritten from "UNUSE" to "USE" (ST2).

After that, the center OAM section 35 copies the thus assigned down stream packet time slot numbers to the time slot number table. More specifically, it writes the numbers "&m" to "&(m+7)" into the areas of the time slot number table which correspond to the service port number "S3" of the first user apparatus (ST3).

Lastly, the section 35 writes, into the areas of the TDMA table which correspond to the numbers "&m" to "&(m+7)", the destination identifier (DST IN) assigned as a result of the above-mentioned plug and play processing, and "PRI" as the type information (INFFLG) indicative of the ISDN primary group service (ST4). In this case, "#1 S3" is assigned as the destination identifier (DST IN).

Where, on the other hand, a registered terminal interface card 8 has been removed, the time slot number table is referred to determine the number of the down stream packet time slot assigned to the service port number of the connector 14 to which the removed terminal interface card 8 was connected, thereby deleting a destination identifier (DST ID) and type information (INFFLG) written in the TDMA table and corresponding to the determined number, and changing the state of the TDMA status to "UNUSE". Lastly, the information is deleted, which is written in the service table and the time slot number table and corresponds to the service port number of the connector 14 to which the removed terminal interface card 8 was connected.

Figure 21:
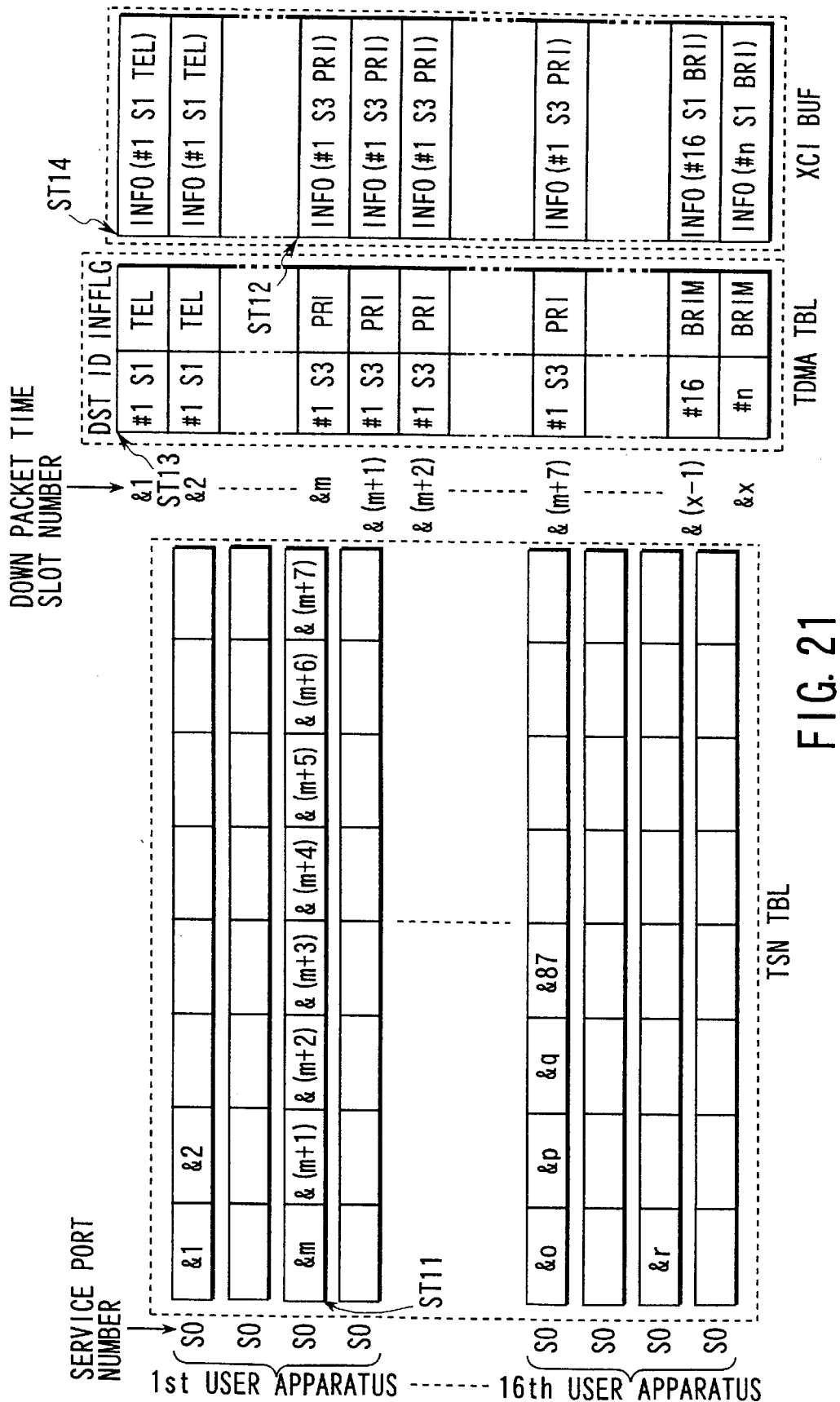
FIG. 21 is a view useful in explaining the generation procedure of a down stream frame.

Referring then to FIG. 21, the procedure of actually generating down stream frames in accordance with the above-described tables, in which various information items are registered, will be described.

First, the time slot control section 312c determines the service port number of the connector 14 connected to the terminal interface card 8 to which a destination terminal of data supplied from the cross connecting section 33 is connected, thereby retrieving, on the basis of the determination result, the numbers of down stream packet time slots to be used to transmit the data from the time slot number table. Specifically, concerning data to be sent to a communication terminal connected to the terminal interface card 8 connected to the connector 14 with the service port number "S3" in the first user apparatus, it is determining, as a result of the search of the time slot number table, that the numbers of the down stream packet time slots to be used to transmit the data are "&m" to "&(m+7)".

As is shown in FIG. 21, the frame generating section 312f has a cross connect interface buffer (XCI BUF) which secures areas for storing user information (INFO) in relation to the numbers of down stream packet time slots.

The time slot control section 312c controls the frame generating section 312f so as to write, into the areas of the cross connect interface buffer which correspond to the numbers "&m" to "&(m+7)" determined at ST11, data to be sent to a communication terminal connected to the terminal interface card 8 connected to the connector 14 with the service port number "S3" in the first user apparatus (ST12).

After all data corresponding to one sub-frame is written into the cross connect interface buffer, which data should be sent to a communication terminal connected to the user apparatus 1 which is connected, via the optical fiber network, to the optical user line terminating section 31-1, the time slot control section 312c reads the destination identifier (DST ID) and the type information (INFFLG) written in the TDMA table in relation to the number "&1", and supplies them to the frame generating section 312f (ST13).

The frame generating section 312f, in turn, sequentially outputs the destination identifier (DST ID) from the time slot control section 312c, a predetermined staff byte, OAM information (OAMB) from the center OAM section 35, the type information (INFFLG) from the time slot control section 312c, thereby reading the user information (INFO) written in the cross connect interface buffer in relation to the number "&1", and outputting it (ST14).

As a result, an information string of a configuration as shown in FIG. 9 is output from the frame generating section 312f.

A down stream frame corresponding to one sub-frame is generated by repeating the above-described processing with the destination number sequentially increased. It should be noted, however, that the guard time data (GT), the preamble data (PA), the framing word data (FW), the common down stream OAM signal (OAM COM), the individual down stream OAM signal (OAMDn) and the timing management data (TMn) are attached separately.

The operation of the user apparatus 1 which is assumed when it has received a down stream optical signal containing the above-described down stream frame will now be described.

When a down stream optical signal transmitted from the center apparatus 3 via the optical fiber network 2 has reached the user apparatus 1, it is guided to the optical receiving section 11b via the optical branching/coupling unit 11a, where it is converted into an electric signal.

This down stream electric signal is subjected to frame synchronization by the frame synchronizing section 12a, and then separated by the frame terminating section 12b.

The frame terminating section 12b determines whether or not the destination identifier (DST ID) contained in each down stream packet time slot (TSD01 to TSDx) is assigned to a corresponding terminal connection port of any terminal interface card mounted in the user apparatus. If it is determined that the destination identifier is assigned to it, this identifier (DST ID) is supplied to the address processing section 13e, and user information (INFO) as payload information is output to the down stream data bus 13a. At this time, the address processing section 13e generates a down stream address indicative of the terminal interface card 8 corresponding to the destination identifier (DST ID) supplied from the frame terminating section 12b, and its terminal connection port(s), thereby outputting it to the down stream address bus 13c.

The terminal interface card 8 fetches data from the down stream data bus 13a only when the processing is in the down stream frame period, and the down stream address indicates the card itself. The data fetched by the terminal interface card 8 is output to a communication terminal connected to the port corresponding to the destination identifier (DST ID) after it is converted into a signal suitable for the communication terminal.

As a result, the user information (INFO) inserted in each down stream packet time slot (TSD01 to TSDx) is sent to the communication terminal as the destination.

In the time slot control section 12c, the destination identifiers (DST ID) and the type information (INFFLG) are fetched from the frame terminating section 12b and stored in the order of input. When the down stream frame period finishes, and an up stream frame period starts, the time slot control section 12c sequentially outputs, to the frame generating section 12d in the order of input, the stored identification identifiers (DST ID) and type information (INFFLG) in accordance with the generation time of each up stream packet time slot (TSU01 to TSUx). Accordingly, the time slot control section 12c can be formed of a simple circuit which employs an FIFO memory.

When the frame generating section 12d has received the destination identifier (DST ID) and the type information (INFFLG), it determines whether or not the destination identifier (DST ID) is assigned to a corresponding terminal connection port of any terminal interface card mounted in the user apparatus. Only if it is determined that the destination identifier is assigned to it, the identifier.(DST ID) is supplied to the address processing section 13e. At this time, the address processing section 13e generates a down stream address indicative of the terminal interface card 8 corresponding to the destination identifier (DST ID) supplied from-the frame terminating section 12b, and its terminal connection port, thereby outputting it to the down stream address bus 13c.

The terminal interface card 8 converts, into data of a form suitable for transmission in the up stream data bus 13b, a signal input through the terminal connection port designated by an up stream address only when the processing is in the up stream frame period and the up stream address indicates the card itself, and outputs the data to the up stream data bus 13b. Further, at this time, the terminal interface card 8 outputs the up stream address information of the above-described configuration (shown in FIG. 15) to the up stream address bus 13d.

While outputting the down stream address during the up stream frame period as described above, the address processing section 13e simultaneously monitors up stream address information input thereto via the up stream address bus 13d. The address processing section 13e supplies allowance of transmission to the frame generating section 12d only when the up stream address indicates the same terminal connection port as designated by the down stream address, and as the same time when the Null information contained in the up stream address information is not "Null".

Upon receiving the allowance of transmission, the frame generating section 12d fetches data from the up stream data bus 13b, uses it as user information (INFO), and adds a predetermined header to the data, thereby creating an up stream packet.

The above-described operation is repeated to create an up stream frame.

The thus-created up stream frame is delayed by the delay section 12f by the delay amount set as a result of the aforementioned delay control, then converted into an up stream optical signal by the optical transmitting section 11c, and output to the optical fiber network 2 via the optical branching/coupling unit 11a.

When the up stream optical signal transmitted from the user apparatus 1 in a manner as above has reached the center apparatus 3, it is supplied to the optical receiving section 311b via the optical branching/coupling unit 311a, where it is converted into an up stream electric signal.

This up stream electric signal is subjected to frame synchronization by the frame synchronizing section 312a, and then separated by the frame terminating section 312b, whereby overhead information is removed therefrom, and only the user information (INFO) is converted into a form suitable for processing performed in the cross connect section 33, and then supplied to the cross connect section 33.

The data supplied to the cross connect section 33 consists of data pieces output from multiple communication terminals and arranged in a time division manner. The order of the data pieces is identical to the order of assignment of them to the down stream packet time slots (TSD01 to TSDx) and hence known to the center apparatus 3. Thus, each user information piece is distributed by the cross connect section 33 to a section corresponding to the sender and destination of the information, and output to the destination.

As described above, in the embodiment, each user apparatus 1 is connected to the center apparatus 3 via the optical fiber network 2 which has a big transmission band, and part of the transmission band of the optical fiber network is assigned to the user apparatus 1. This enables change of transmission bands in the center apparatus 3 without, for example, line construction. Further, the user can obtain different types of communication services through a single optical fiber transmission line. Moreover, a plurality of users can commonly use the transmission equipment of the station side, which leads to implementation of a low cost system. Thus, the provision of a plurality of services using a common network makes it easier to construct and manage a network and therefore to enable the use of various communication services at low cost.

In addition, since each user apparatus 1 always monitors the state of the terminal interface cards 8 mounted therein, and automatically notifies the center apparatus 3 of the state, the center apparatus 3 can manage the configuration of the user apparatus 1.

When the configuration of any user apparatus 1 has changed, destination identifier (DST ID) or band releasing, or destination identifier (DST ID) or band assignment is performed automatically in accordance with the changed contents, and the results of the releasing or assignment are set in the user apparatus 1 or the center apparatus 3. Accordingly, at the later stages, data transmission can be performed between the center apparatus 3 and the user apparatus 1 under the updated setting, which means that the user apparatus 1 can obtain a communication service corresponding to the configuration thereof.

Therefore, if the user attaches a terminal interface card 8 to the user apparatus 1 or detaches it therefrom, they can change a communication service to be provided to the user apparatus 1. Thus, the user does not need to ask the communication service provider to change it, or the communication provider does not need to perform line construction.

When the user performs attachment or detachment of a terminal interface card 8 to or from the user apparatus 1, or exchanges it for another by terminating the above-described plug and play processing in several seconds or less, they can obtain almost instantly a communication service corresponding to the configuration-changed user apparatus 1. Also, where some of the terminal interface cards 8 are exchanged, the other ones unchanged can continue service provision without being influenced by the exchange.

Since in the embodiment, the configuration information (ATTR) indicative of the mount state of terminal interface cards 8 in the user apparatus 1 is transmitted using the timing response data (TRn) set for delay control, it can be transmitted to the center apparatus 3 without waiting for the completion of the delay control, thereby reducing the waiting time required until the provision of communication services can be started.

Further, since in the embodiment, the communication service provider can manage in detail the contents of communication services provided to each user apparatus 1, it can perform user management such as accounting management, and also can limit a to-be-assigned band in accordance with the contents of a contract.

Furthermore, in the embodiment, the transmission band of the user information (INFO) is three B-channels for each of the down stream packet time slots (TSD01 to TSDx) and the up stream packet time slots (TSU01 to TSUx) set in each transmission frame on the optical fiber network 2. Accordingly, the transmission band can be divided in units of three B-channels for each communication terminal, which means that various services of different bandwidths such as analog telephone services, N-ISDN services, ISDN primary group services, etc. can be dealt with flexibly.

Similarly, the down stream data bus 13a and the up stream data bus 13b of the user apparatus 1 can transmit data by dividing it in units of three B-channels. Therefore, terminal interface cards 8 can be mounted easily into the user apparatus, which correspond to various services of different bandwidths such as analog telephone services, N-ISDN services, ISDN primary group services, etc.

Since in the embodiment, the distributes (maker names, specification numbers, the types of communication services which can be provided, etc.) of the terminal interface cards 8 are written into the up stream address and notified of to the user apparatus 1, the user apparatus 1 can check the attributes of the terminal interface cards 8 mounted therein, without interrupting the transmission of the user information (INFO).

Also, in the embodiment, assignment of down stream packet time slots (TSD01 to TSDx), i.e. assignment of bands, can be changed easily and flexibly by managing the assignment state of the down stream packet time slots (TSD01 to TSDx) using the four tables shown in FIG. 20.

In the embodiment, the down stream packet time slots (TSD01 to TSDx) correspond to the up stream packet time slots (TSU01 to TSUx), respectively, and the user apparatus 1 collects each user information (INFO) piece, using a destination contained in each down stream packet time slot, as the sender of the user information (INFO) piece to be transmitted using an up stream packet time slot corresponding to the down stream packet time slot. As a result, an up stream frame is generated. This being so, it is not necessary for the user apparatus 1 to manage the assignment state of each up stream packet time slot (TSU01 to TSUx), thereby reducing the load of processing on the user apparatus 1, and making it not necessary for the center apparatus 3 to notify the user apparatus 1 of the contents of change each time the center apparatus 3 performs change of assignment. Moreover, since the center apparatus 3 has information on the sender of user information (INFO) inserted in each up stream packet time slot (TSU01 to TSUx), it is not necessary to insert, in the up stream packet time slot (TSU01 to TSUx), information indicative of the sender.

The present invention is not limited to the above embodiment. Although in the embodiment, for example, the configuration information (ATTR) is supplied from the user apparatus 1 to the center apparatus 3, using the timing response data (TRn), it may be done using other timing such as the up stream packet time slot (TSU01 to TSUx).

Although the user apparatus 1 has four connectors 14, and hence four terminal interface cards 8 at maximum can be mounted therein simultaneously, the number of connectors incorporated in the user apparatus is optional, and it suffices if there is at least one connector 14.

The configuration of the transmission frame or of each time slot is not limited to that employed in the embodiment, but may be modified in various manners.

Although in the embodiment, the center apparatus 3 releases the destination identifier (DST ID) or band based on information from the user apparatus 1 even when the monitor/control unit 4 determines a bandwidth to be assigned, it may be modified such that the monitor/control unit 4 determines which destination identifier (DST ID) or band should be released, while the center apparatus 3 releases the destination identifier (DST ID) or band based on an instruction from the monitor/control unit 4.

Although in the embodiment, a "point-to-multipoint" connection type (star-form) optical fiber network 2 is used to connect each user apparatus 1 to the center apparatus 3, another type network such as a "point-to-point" connection type or a "point-to-multipoint" connection type with the form of a tree may be used. The present invention is not limited to optical transmitting networks, but also applicable to networks using coaxial cables or radio networks.

Although in the embodiment, up stream and down stream transmission is implemented by time-division multiplexing, it can be implemented by multiplexing which utilizes wavelength division using different wavelengths. In this case, the up stream and down stream frames are defined independent of each other.

A single user apparatus 1 can be used by a single user, or can be commonly used by a plurality of users.

Although in the embodiment, the terminal interface cards 8 are mounted in the user apparatus 1, the present invention is not limited only to using terminal interface units in the form of cards, but units of other forms are also applicable to the present invention.

In addition, the present invention can be modified in various manners without departing from its gist.

As described above, according to a first aspect of the present invention, the user apparatus is equipped with: terminal interface mounting means capable of mounting thereon at least one of terminal interface units which are prepared in accordance with desired communication services; terminal interface detecting means for detecting, at predetermined points of time (for example, at regular intervals or periodically), whether or not any terminal interface unit is mounted on the terminal interface mounting means; and configuration information transmitting means for transmitting to the center apparatus, at predetermined points of time (for example, when responding to a request for measurement of delay time from the center apparatus), predetermined configuration information indicative of the configuration of the user apparatus and containing the detection result of the terminal interface detecting means.

In the center apparatus, user configuration managing means recognizes and manages the configuration of the user apparatus on the basis of the configuration information transmitted from the user apparatus; identification information setting means newly sets, when the user configuration managing means has recognized that a terminal interface unit has been newly mounted, identification information peculiar to the newly mounted terminal interface unit, and invalidates, when the user configuration managing means has recognized that a terminal interface unit has been removed, identification information having been set for the removed terminal interface unit. Further, identification information supply means supplies identification information newly set by the identification information setting means, to the user apparatus when a terminal interface unit corresponding to the newly set identification information is mounted in the user apparatus.

Furthermore, identification information managing means provided in the user apparatus manages the identification information supplied from the center apparatus, in relation to a terminal interface unit corresponding to the supplied identification information.

By virtue of the above-described configuration, any of terminal interface units prepared in accordance with desired communication services can be optionally mounted. The user apparatus can be made to have a configuration for obtaining any desired communication service, by mounting therein a terminal interface unit corresponding to the service. Various kinds of setting processes necessary for providing a communication service corresponding to a configuration optionally set in the user apparatus are automatically performed, thereby permitting the user apparatus to obtain any desired communication service. As a result, exchange, addition and/or cancel of communication services which the user obtains can be performed easily.

According to a second aspect of the present invention, the user apparatus is equipped with, in addition to the means employed therein according to the first aspect, terminal interface identifying means for identifying, at predetermined points of time (for example, periodically or at regular intervals), the type of each terminal interface unit mounted on the terminal interface mounting means, and the configuration information transmitting means causes the identification result of the terminal interface identifying means to be included in the configuration information to be transmitted to the center apparatus.

Further, in the center apparatus, the user configuration managing means manages both the configuration of the user apparatus and the identification result of the terminal interface identifying means contained in the configuration information, and transmission band assigning means is employed for setting to an unused band, when the user configuration managing means has recognized that any terminal interface unit has been removed, a transmission band having been assigned to the removed terminal interface unit, the transmission band assigning means assigning, when the user configuration managing means has recognized that another terminal interface unit has been newly mounted, a transmission band corresponding to the type to the newly mounted terminal interface unit.

As a result, even when different communication services corresponding to different terminal interface units require different transmission bands, the transmission bands necessary for the services are automatically assigned, thereby enabling provision of communication services using appropriate transmission bands. Accordingly, the communication system can easily and flexibly deal with exchange, addition and/or cancel of communication services which the user can use.

According to a third aspect of the present invention, the user apparatus is equipped with, in addition to the means employed therein according to the first and second aspects, a down stream signal transmission line for transmitting a down stream signal to each terminal interface unit via the terminal interface mounting means; an up stream signal transmission line for transmitting an up stream signal fetched via the terminal interface mounting means; a designated information transmission line for transmitting terminal interface designating information which designates a terminal interface unit which is permitted to fetch the down stream signal to be transmitted in the down stream signal transmission line, and permitted to output the up stream signal to the up stream signal transmission line; and a report information transmission line for transmitting sender-reporting information output from the each terminal interface unit, the report information transmission line being used while the each terminal interface unit as the sender transmits a signal to the up stream signal transmission line; the each terminal interface unit has report information output means for outputting, to the report information transmission line, predetermined sender-reporting information containing at least type information indicative of the type of the user. apparatus, when the designation information transmitted via the designation information transmission line designates the user apparatus itself; and the terminal interface identifying means identifies the type of the each terminal interface unit mounted on the terminal interface mounting means, on the basis of the type information contained in the sender-reporting information output from the report information output means.

By virtue of this configuration, the user apparatus can acquire the type information without influencing signal transmission on the down stream or up stream signal transmission line, and can know the type of each terminal interface unit from the type information. This is advantageous in implementing the configuration of the present invention according to the first or second aspect.

According to a fourth aspect of the present invention, a down stream frame period is set for which a down stream signal, as a transmission signal to be transmitted in the communication line between each user apparatus and the center apparatus, is transmitted from the center apparatus to the each user apparatus, while an up stream frame period is set for which an up stream signal, as another transmission signal to be transmitted in the communication line between the each user apparatus and the center apparatus, is transmitted from the each user apparatus to the center apparatus. Further, pairs of down stream time slots and up stream time slots are set during each of the down stream and up stream frame periods.

Moreover, in the center apparatus, time slot assignment storing means pre-stores the contents of each down stream time slot assigned to a corresponding terminal. Down frame generating means is provided for generating a down stream frame by dividing, in units of a predetermined length (for example, a length which corresponds to a transmission band of 192 kbit/s), a signal to be transmitted to terminals, thereby adding at least identification information indicative of each terminal as a destination, to a corresponding signal component resulting from the division, then forming a predetermined down stream packet, determining that one of the down stream time slots which is assigned to a terminal as the destination of the down stream packet with reference to the time slot assignment storing means, and inserting the down stream packet into the determined down stream time slot. Further, down stream frame transmitting means is provided for transmitting the down stream frame generated by the down stream frame generating means, to the communication line during the down stream frame period.

On the other hand, in the user apparatus, down stream time slot managing means is provided for determining, from the down stream frames transmitted via the communication line during the down stream frame period, that one of the down stream time slots in which identification information corresponding to a terminal connected to the each user apparatus is contained, thereby managing the relationship between the down stream time slot and a terminal to which the down stream time slot is assigned. Further, up stream frame generating means is provided for generating an up stream frame by forming a predetermined up stream packet which includes signal components obtained by dividing, in units of a predetermined length, a signal transmitted from each terminal connected to the each user apparatus, and also determining, with reference to the management contents of the down stream time slot managing means, that one of the down stream time slots which was assigned to a sender terminal indicated by a signal inserted in the up stream packet, and inserting the up stream packet into an up stream time slot corresponding to the determined down stream time slot. Up frame transmitting means transmits the up stream frame generated by the up stream frame generating means, to the communication line during the up stream frame period.

Further, in the center apparatus, sender determining means is provided for determining that a sender terminal which has output a signal inserted in each up stream packet contained in a signal transmitted to the center apparatus via the communication line during the up stream frame period is a terminal to which a down stream time slot corresponding to an up stream time slot which contains the each up stream packet is assigned.

By virtue of the above configuration, it is not necessary for the user apparatus to beforehand manage the assignment state of each up stream time slot in the up stream frame, or to add, to each up stream time slot, identification information indicative of a sender terminal. Accordingly, the communication system can easily and flexibly deal with exchange, addition and/or cancel of communication services which the user can use.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A communication system comprising:
    a center apparatus for providing a plurality of communication services;
    user apparatuses each connected to the center apparatus via a communication line;
    terminal interface mounting means provided in each user apparatus and capable of mounting thereon at least one of terminal interface units which are prepared in accordance with desired communication services;
    terminal interface detecting means provided in said each user apparatus for detecting at a predetermined timing whether or not any terminal interface unit is mounted on the terminal interface mounting means;
    configuration information transmitting means provided in said each user apparatus for transmitting to the center apparatus, at a predetermined timing, predetermined configuration information indicative of the configuration of said each user apparatus and containing the detection result of the terminal interface detecting means;
    user configuration managing means provided in the center apparatus for recognizing and managing the configuration of said each user apparatus on the basis of the configuration information transmitted from said each user apparatus;
    identification information setting means provided in the center apparatus for newly setting, when the user configuration managing means has recognized that a terminal interface unit has been newly mounted, identification information peculiar to the newly mounted terminal interface unit, and for invalidating, when the user configuration managing means has recognized that a terminal interface unit has been removed, identification information having been set for the removed terminal interface unit;
    identification information notifying means provided in the center apparatus for notifying identification information newly set by the identification information setting means, to that one of the user apparatuses on which a terminal interface unit corresponding to the newly set identification information is mounted; and
    identification information managing means provided in said each user apparatus for managing the identification information notified from the center apparatus, in relation to a terminal interface unit corresponding to the notified identification information.

2. A communication system according to claim 1, wherein the terminal interface detecting means periodically detects whether or not any terminal interface unit is mounted on the terminal interface mounting means.

3. A communication system according to claim 1, wherein:
    said each user apparatus includes terminal interface identifying means for identifying, at a predetermined timing, the type of each terminal interface unit mounted on the terminal interface mounting means, the configuration information transmitting means causing the identification result of the terminal interface identifying means to be included in the configuration information to be transmitted to the center apparatus; and
    the center apparatus controls the user configuration managing means so as to manage both the configuration of said each user apparatus and the identification result of the terminal interface identifying means contained in the configuration information, the center apparatus also including transmission band assigning means for setting to an unused band, when the user configuration managing means has recognized that any terminal interface unit has been removed, a transmission band having been assigned to the removed terminal interface unit, the transmission band assigning means assigning, when the user configuration managing means has recognized that another terminal interface unit has been newly mounted, a transmission band corresponding to the type to the newly mounted terminal interface unit.

4. A communication system according to claim 3, wherein a transmission frame including a plurality of time slots which can each transmit user information at a rate of 192 kbit/s is set in a transmission signal to be transmitted in the communication line which connects said each user apparatus to the center apparatus, and the transmission band assigning means assigns a transmission band in units of one time slot.

5. A communication system according to claim 3, wherein said each user apparatus includes:
   a down stream signal transmission line for transmitting a down stream signal to each terminal interface unit via the terminal interface mounting means;
   an up stream signal transmission line for transmitting an up stream signal fetched via the terminal interface mounting means;
   a designated information transmission line for transmitting terminal interface designating information which designates a terminal interface unit which is permitted to fetch the down stream signal to be transmitted in the down stream signal transmission line, and permitted to output the up stream signal to the up stream signal transmission line; and
   a report information transmission line for transmitting sender-reporting information output from said each terminal interface unit, the report information transmission line being used while said each terminal interface unit as the sender transmits a signal to the up stream signal transmission line;
   said each terminal interface unit has report information output means for outputting, to the report information transmission line, predetermined sender-reporting information containing at least type information indicative of the type of said each user apparatus, when the designation information transmitted via the designation information transmission line designates said each user apparatus itself; and
   the terminal interface identifying means identifies the type of said each terminal interface unit mounted on the terminal interface mounting means, on the basis of the type information contained in the sender-reporting information output from the report information output means.

6. A communication system according to claim 3, wherein the terminal interface identifying means periodically identifies the type of said each terminal interface unit mounted on the terminal interface mounting means.

7. A communication system according to claim 1, wherein:
   the center apparatus includes means for measuring a period of time required from a point of time at which the center apparatus transmits a request for measurement of a delay time, to a point of time at which a response from said each user apparatus to the request reaches the center apparatus, thereby measuring a transmission delay and controlling, on the basis of the measured transmission delay, the point of time at which said each user apparatus transmits a signal; and
   the configuration information transmitting means transmits configuration information together with the response to the request for measurement of the delay time.

8. A communication system comprising:
   a center apparatus for providing a plurality of communication services;
   user apparatuses each connected to the center apparatus via a communication line;
   means for setting a down stream frame period for which a down stream signal, as a transmission signal to be transmitted in the communication line between said each user apparatus and the center apparatus, is transmitted from the center apparatus to said each user apparatus, also for setting an up stream frame period for which an up stream signal, as another transmission signal to be transmitted in the communication line between said each user apparatus and the center apparatus, is transmitted from said each user apparatus to the center apparatus, and for setting pairs of down stream time slots and up stream time slots during each of the down stream and up stream frame periods;
   time slot assignment storing means provided in the center apparatus and pre-storing the contents of each down stream time slot assigned to a corresponding terminal;
   down stream frame generating means provided in the center apparatus for generating a down stream frame by dividing, in units of a predetermined length, a signal to be transmitted to terminals, thereby adding at least identification information indicative of each terminal as a destination, to a corresponding signal component resulting from the division, then forming a predetermined down stream packet, determining that one of the down stream time slots which is assigned to a terminal as the destination of the down stream packet with reference to the time slot assignment storing means, and inserting the down stream packet into the determined down stream time slot;
   down stream frame transmitting means provided in the center apparatus for transmitting the down stream frame generated by the down stream frame generating means, to the communication line during the down stream frame period;
   down stream time slot managing means provided in said each user apparatus for determining, from the down stream frame transmitted via the communication line during the down stream frame period, that one of the down stream time slots in which identification information corresponding to a terminal connected to said each user apparatus is contained, thereby managing the relationship between the down stream time slot and a terminal to which the down stream time slot is assigned;
   up stream frame generating means provided in said each user apparatus for generating an up stream frame by forming a predetermined up stream packet which includes signal components obtained by dividing, in units of a predetermined length, a signal transmitted from each terminal connected to said each user apparatus, and also determining, with reference to the management contents of the down stream time slot managing means, that one of the down stream time slots which was assigned to a sender terminal indicated by a signal inserted in the up stream packet, and inserting the up stream packet into an up stream time slot corresponding to the determined down stream time slot;
   up stream frame transmitting means provided in said each user apparatus for transmitting the up stream frame generated by the up stream frame generating means, to the communication line during the up stream frame period; and
   sender determining means provided in the center apparatus for determining that a sender terminal which has output a signal inserted in each up stream packet contained in a signal transmitted to the center apparatus via the communication line during the up stream frame period is a terminal to which a down stream time slot corresponding to an up stream time slot which contains the up stream packet is assigned.

9. A communication system according to claim 8, wherein each of the down stream and up stream packets contains a signal to be transmitted at a rate of 192 kbit/s when using one time slot.

10. A user apparatus to be connected via a communication line to a center apparatus for providing a plurality of communication services, comprising:

terminal interface mounting means capable of mounting thereon at least one of terminal interface units which are prepared in accordance with desired communication services;

terminal interface detecting means for detecting at a predetermined timing whether or not any terminal interface unit is mounted on the terminal interface mounting means;

configuration information transmitting means for transmitting to the center apparatus, at a predetermined timing, predetermined configuration information indicative of the configuration of the user apparatus and containing the detection result of the terminal interface detecting means; and identification information managing means provided in the user apparatus for managing the identification information notified from the center apparatus, in relation to a terminal interface unit corresponding to the notified identification information.

11. A user apparatus according to claim 10, further comprising terminal interface identifying means for identifying, at a predetermined timing, the type of each terminal interface unit mounted on the terminal interface mounting means, and the configuration information transmitting means causes the identification result of the terminal interface identifying means to be included in the configuration information to be transmitted to the center apparatus.

12. A user apparatus according to claim 11, further comprising:

a down stream signal transmission line for transmitting a down stream signal to each terminal interface unit via the terminal interface mounting means;

an up stream signal transmission line for transmitting an up stream signal fetched via the terminal interface mounting means;

a designated information transmission line for transmitting terminal interface designating information which designates a terminal interface unit which is permitted to fetch the down stream signal to be transmitted in the down stream signal transmission line, and permitted to output the up stream signal to the up stream signal transmission line; and a report information transmission line for transmitting sender-reporting information output from the terminal interface unit, the report information transmission line being used while the terminal interface unit as the sender transmits a signal to the up stream signal transmission line;

and wherein the terminal interface identifying means identifies the type of the terminal interface unit mounted on the terminal interface mounting means, on the basis of the type information contained in the sender-reporting information output from the report information output means.

13. A user apparatus to claim 10, further comprising:

a down stream signal transmission line for transmitting a down stream signal to each terminal interface unit via the terminal interface mounting means; and an up stream signal transmission line for transmitting an up stream signal fetched via the terminal interface mounting means;

and wherein a transmission frame including a plurality of groups which can each transmit user information at a rate of 192 kbit/s is set in a transmission signal to be transmitted in the communication line which connects the user apparatus to the center apparatus, and transmission of user information concerning any terminal interface unit mounted on the terminal interface mounting means is performed in units of one group.

14. A user apparatus to be connected via a communication line to a center apparatus for providing a plurality of communication services, comprising:

means for setting a down stream frame period for which a down stream signal, as a transmission signal to be transmitted in the communication line between the user apparatus and the center apparatus, is transmitted from the center apparatus to the user apparatus, also for setting an up stream frame period for which an up stream signal, as another transmission signal to be transmitted in the communication line between the user apparatus and the center apparatus, is transmitted from the user apparatus to the center apparatus, and for setting pairs of down stream time slots and up stream time slots during each of the down stream and up stream frame periods;

down stream time slot managing means for determining, from the down stream frames transmitted via the communication line during the down stream frame period, that one of the down stream time slots in which identification information corresponding to a terminal connected to the user apparatus is contained, thereby managing the relationship between the down stream time slot and a terminal to which the down stream time slot is assigned;

up stream frame generating means for generating an up stream frame by forming a predetermined up stream packet which includes signal components obtained by dividing, in units of a predetermined length, a signal transmitted from each terminal connected to the user apparatus, and also determining, with reference to the management contents of the down stream time slot managing means, that one of the down stream time slots which was assigned to a sender terminal indicated by a signal inserted in the up stream packet, and inserting the up stream packet into an up stream time slot corresponding to the determined down stream time slot; and up stream frame transmitting means for transmitting the up stream frame generated by the up stream frame generating means, to the communication line during the up stream frame period.

15. A center apparatus for providing a plurality of communication services to each of user apparatuses connected thereto via a communication line, comprising:

user configuration managing means for recognizing and managing the configuration of said each user apparatus on the basis of the configuration information transmitted from said each user apparatus;

identification information setting means for newly setting, when the user configuration managing means has recognized that a terminal interface unit has been newly mounted, identification information peculiar to the newly mounted terminal interface unit, and for invalidating, when the user configuration managing means has recognized that a terminal interface unit has been removed, identification information having been set for the removed terminal interface unit; and identification information notifying means for notifying identification information newly set by the identification information setting means, to that one of the user apparatuses on which a terminal interface unit corresponding to the newly set identification information is mounted.

16. A center apparatus according to claim 15, wherein the user configuration managing means manages both the configuration of the user apparatus and the identification result of the terminal interface identifying means contained in the configuration information, and further comprising transmission band assigning means for setting to an unused band, when the user configuration managing means has recognized that any terminal interface unit has been removed, a transmission band having been assigned to the removed terminal interface unit, the transmission band assigning means assigning, when the user configuration managing means has recognized that another terminal interface unit has been newly mounted, a transmission band corresponding to the type to the newly mounted terminal interface unit.

17. A center apparatus for providing a plurality of communication services to each of user apparatuses connected thereto via a communication line, comprising:

means for setting a down stream frame period for which a down stream signal, as a transmission signal to be transmitted in the communication line between said each user apparatus and the center apparatus, is transmitted from the center apparatus to said each user apparatus, also for setting an up stream frame period for which an up stream signal, as another transmission signal to be transmitted in the communication line between said each user apparatus and the center apparatus, is transmitted from said each user apparatus to the center apparatus, and for setting pairs of down stream time slots and up stream time slots during each of the down stream and up stream frame periods;

time slot assignment storing means pre-storing the contents of each down stream time slot assigned to a corresponding terminal;

down stream frame generating means for generating a down stream frame by dividing, in units of a predetermined length, a signal to be transmitted to terminals, thereby adding at least identification information indicative of each terminal as a destination, to a corresponding signal component resulting from the division, then forming a predetermined down stream packet, determining that one of the down stream time slots which is assigned to a terminal as the destination of the down stream packet with reference to the time slot assignment storing means, and inserting the down stream packet into the determined down stream time slot;

down stream frame transmitting means for transmitting the down stream frame generated by the down stream frame generating means, to the communication line during the down stream frame period; and sender determining means for determining that a sender terminal which has output a signal inserted in each up stream packet contained in a signal transmitted to the center apparatus via the communication line during the up stream frame period is a terminal to which a down stream time slot corresponding to an up stream time slot which contains the up stream packet is assigned.

18. A terminal interface unit to be mounted on terminal interface mounting means in a user apparatus and to be connected to a communication terminal, for interfacing the user apparatus with the communication terminal and performing an interface operation corresponding to a communication service which the user apparatus will obtain, comprising:

means for detecting that designation information transmitted to the user apparatus via a designation information transmission line provided for the user apparatus designates the user apparatus itself; and report information output means for outputting, to a report information transmission line provided in the user apparatus, predetermined sender-reporting information containing at least type information indicative of the type of the user apparatus, when the designation information designates the user apparatus itself.

* * * * *